US011469851B2

(12) United States Patent
Zhang et al.

(10) Patent No.: US 11,469,851 B2
(45) Date of Patent: Oct. 11, 2022

(54) METHOD AND DEVICE USED IN WIRELESS COMMUNICATION NODE

(71) Applicants: Xiaobo Zhang, Shanghai (CN); Lin Yang, Shanghai (CN)

(72) Inventors: Xiaobo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 17/022,109

(22) Filed: Sep. 16, 2020

(65) Prior Publication Data
US 2021/0006350 A1 Jan. 7, 2021

Related U.S. Application Data

(63) Continuation of application No. PCT/CN2019/085631, filed on May 6, 2019.

(30) Foreign Application Priority Data

May 29, 2018 (CN) .......................... 201810528415.4

(51) Int. Cl.
H04L 1/00 (2006.01)
H04W 4/40 (2018.01)
(Continued)

(52) U.S. Cl.
CPC ............ H04L 1/0028 (2013.01); H04B 1/02 (2013.01); H04B 1/06 (2013.01); H04W 4/40 (2018.02);
(Continued)

(58) Field of Classification Search
None
See application file for complete search history.

(56) References Cited

U.S. PATENT DOCUMENTS

2011/0103307 A1  5/2011 Kim et al.
2012/0195272 A1  8/2012 Hong et al.
(Continued)

FOREIGN PATENT DOCUMENTS

CN   103959876 A   7/2014
CN   104904305 A   9/2015
(Continued)

OTHER PUBLICATIONS

Author Unknown, 3rd Generation Partnership Project, Technical Specification Group Radio Access Network, NR, Physical layer procedures for control (Release 15), pp. 1-77, Mar. 2018.*
(Continued)

Primary Examiner — Christopher M Crutchfield

(57) ABSTRACT

The present disclosure discloses a method and a device in a node for wireless communications. A first node receives a first signaling, the first signaling being used for indicating a first time unit format; and transmits first information and second information; herein, the first information is used for indicating a first symbol set and a second symbol set; the first symbol set and the second symbol set respectively comprise a positive integer number of multicarrier symbol(s); each multicarrier symbol in the first symbol set corresponds to first-type symbols in the first time unit format, while each multicarrier symbol in the second symbol set corresponds to second-type symbols in the first time unit format; each of the first-type symbols comprises (a) downlink symbol(s), while each of the second-type symbols comprises (an) uplink symbol(s). The present disclosure expands access to transmission resources for sidelink.

15 Claims, 17 Drawing Sheets

(51) Int. Cl.
*H04B 1/02* (2006.01)
*H04B 1/06* (2006.01)
*H04W 72/04* (2009.01)
*H04W 88/04* (2009.01)
*H04W 84/04* (2009.01)

(52) U.S. Cl.
CPC ......... *H04W 72/04* (2013.01); *H04W 84/047* (2013.01); *H04W 88/04* (2013.01)

(56) References Cited

U.S. PATENT DOCUMENTS

| | | | | |
|---|---|---|---|---|
| 2014/0024386 | A1* | 1/2014 | Novak | H04W 72/02 |
| | | | | 455/452.1 |
| 2016/0302224 | A1* | 10/2016 | Khairmode | H04L 5/0055 |
| 2018/0077718 | A1 | 3/2018 | Nory | |
| 2019/0089502 | A1* | 3/2019 | Yi | H04L 5/0041 |
| 2020/0228267 | A1* | 7/2020 | Park | H04L 5/0094 |
| 2020/0304255 | A1* | 9/2020 | Wu | H04L 5/0044 |
| 2021/0160861 | A1* | 5/2021 | You | H04W 72/0446 |
| 2021/0218534 | A1* | 7/2021 | Liu | H04W 72/0446 |

FOREIGN PATENT DOCUMENTS

| | | |
|---|---|---|
| CN | 107078881 A | 8/2017 |
| WO | 2017106045 A1 | 6/2017 |
| WO | 2017194705 A1 | 11/2017 |
| WO | 2019096009 A1 | 5/2019 |

OTHER PUBLICATIONS

Author Unknown, Remaining details on group-common PDCCH, pp. 1-7, Oct. 13, 2017.*
Author Unknown, 3rd Generation Partnership Project, Technical Specification Group Radio Access Network, NR, Radio Resource Control (RRC) protocol specification (Release 15), pp. 1-268, Mar. 2018.*
CN201810528415.4 1st Office Action dated May 6, 2021.
CN201810528415.4 First Search Report dated Apr. 7, 2021.
Huawei et Remaining details on group-common PDCCH,3GPP TSG RAN WG1 Meeting 90bis R1-1717063, Oct. 13, 2017.
CATT Outstanding aspects of slot format indication,3GPP TSG RAN WG1 Meeting AH_#NR3 R1-1715815, Sep. 21, 2017.
ISR in application PCT/CN2019/085631 dated Jul. 8, 2019.

* cited by examiner

METHOD AND DEVICE USED IN WIRELESS COMMUNICATION NODE

CROSS REFERENCE TO RELATED APPLICATIONS

This application is a continuation of International Application No. PCT/CN2019/085631, filed May 6, 2019, claims the priority benefit of Chinese Patent Application No. 201810528415.4, filed on May 29, 2018, the full disclosure of which is incorporated herein by reference.

BACKGROUND

Technical Field

The present disclosure relates to transmission methods and devices in wireless communication systems, and in particular to a multi-antenna related transmission scheme and device in wireless communications.

Related Art

Application scenarios of future wireless communication systems are becoming increasingly diversified, and different application scenarios have different performance demands on systems. In order to meet different performance requirements of various application scenarios, the $3^{rd}$ Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 plenary to standardize the NR.

In response to rapidly growing Vehicle-to-Everything (V2X) traffic, 3GPP has started standards setting and research work under the framework of NR. Currently, 3GPP has completed planning work targeting 5G V2X requirements and has included these requirements into standard TS22.886, where 3GPP identifies and defines 4 major Use Case Groups, covering cases of Vehicles Platooning, supporting Extended Sensors, Advanced Driving and Remote Driving.

SUMMARY

To meet emerging traffic requirements, an NR V2X system is an updated version of the LTE V2X system, featuring higher throughput and reliability, lower latency, more distant communications with more precise positioning, and larger packet size and more various transmission period, as well as key technical features more compatible with the current 3GPP and non-3GPP techniques. Further, the NR V2X will be applied in a higher-frequency section. There is now a hot debate among members of 3GPP about 6 GHz-and-above sidelink channel model, and, at the same time, an NR system will be supporting more flexible uplink and downlink resources configuration, with symbol-level precision.

At present, resources occupied by sidelink communication of LTE D2D/V2X are uplink resources, due to the introduction of slot format in an NR system and flexible configurations of subcarrier spacings (SC S), uplink resources and downlink resource in the NR system will get more fragmentary, making it harder for D2D/V2X traffics to gain access to contiguous uplink resources, thus reducing the chance of transmission of D2D/V2X traffics.

To address the above problem, the present disclosure provides a solution. It should be noted that the embodiments of the User Equipment (UE) of the present disclosure and the characteristics in the embodiments may be applied to a base station if no conflict is incurred, and vice versa. In the case of no conflict, the embodiments of the present disclosure and the characteristics in the embodiments may be combined with each other arbitrarily. Furthermore, though originally targeted at multi-antenna-based communications, the present disclosure is also applicable to single-antenna communications. Besides, the present disclosure not only applies to high-frequency communications, but also to lower-frequency communications.

The present disclosure provides a method in a first node for wireless communications, comprising:
  receiving a first signaling, the first signaling being used for indicating a first time unit format; and
  transmitting first information and second information;
  herein, the first information is used for indicating a first symbol set and a second symbol set; the first symbol set and the second symbol set respectively comprise a positive integer number of multicarrier symbol(s); each multicarrier symbol in the first symbol set corresponds to first-type symbols in the first time unit format, while each multicarrier symbol in the second symbol set corresponds to second-type symbols in the first time unit format; each of the first-type symbols comprises (a) downlink symbol(s), while each of the second-type symbols comprises (an) uplink symbol(s); the second information is used for indicating a first spatial Rx parameter group associated with the first symbol set.

The present disclosure provides a method in a first node for wireless communications, comprising:
  autonomously determining a first time unit format; and
  transmitting first information and second information;
  herein, the first information is used for indicating a first symbol set and a second symbol set; the first symbol set and the second symbol set respectively comprise a positive integer number of multicarrier symbol(s); each multicarrier symbol in the first symbol set corresponds to first-type symbols in the first time unit format, while each multicarrier symbol in the second symbol set corresponds to second-type symbols in the first time unit format; each of the first-type symbols comprises (a) downlink symbol(s), while each of the second-type symbols comprises (an) uplink symbol(s); the second information is used for indicating a first spatial Rx parameter group associated with the first symbol set.

In one embodiment, a problem to be solved in the present disclosure is that fragmentary uplink and downlink resource configurations in 5G NR system will lead to restrictions over sidelink transmission resources. The above method, when applied to high-frequency or multi-antenna scenarios, enables sidelink transmissions in a specific beam direction of downlink symbols through beams being spatially orthogonal, thus expanding resources for sidelink transmissions without influencing the existing system.

In one embodiment, the above method is characterized in that a connection is created between a time-domain resource and a spatial-domain resource.

In one embodiment, the above method is characterized in that a connection is created between a first symbol set and a first spatial Rx parameter group.

In one embodiment, the above method is advantageous in enabling sidelink communication in an idle beam direction of a first symbol set, so as to acquire more opportunities of sidelink transmission.

In one embodiment, the above method is characterized in that the first node is in coverage, and the first information and the second information are configured by a base station.

In one embodiment, the above method is characterized in that the first node is out of coverage, and the first information and the second information are autonomously determined by the first node.

According to one aspect of the present disclosure, the above method is characterized in comprising:

receiving a second signaling, the second signaling being used for indicating a first time unit set; or, autonomously determining a first time unit set;

herein, the first time unit set comprises a positive integer number of time unit(s); each time unit of the positive integer number of time unit(s) comprises a positive integer number of multicarrier symbol(s); the first symbol set is composed of multicarrier symbol(s) in the first time unit set corresponding to the first-type symbols in the first time unit format, while the second symbol set is composed of multicarrier symbol(s) in the first time unit set corresponding to the second-type symbols in the first time unit format.

According to one aspect of the present disclosure, the above method is characterized in comprising:

autonomously determining a first time unit set;

herein, the first time unit set comprises a positive integer number of time unit(s); each time unit of the positive integer number of time unit(s) comprises a positive integer number of multicarrier symbol(s); the first symbol set is composed of multicarrier symbol(s) in the first time unit set corresponding to the first-type symbols in the first time unit format, while the second symbol set is composed of multicarrier symbol(s) in the first time unit set corresponding to the second-type symbols in the first time unit format.

According to one aspect of the present disclosure, the above method is characterized in comprising:

determining whether the first node is in coverage;

herein, when the first node is in coverage, the first time unit format is indicated by the first signaling; when the first node is out of coverage, the first time unit format is determined autonomously.

According to one aspect of the present disclosure, the above method is characterized in comprising:

transmitting Q first-type radio signal(s), Q being a positive integer;

herein, each of the Q first-type radio signal(s) comprises the first information and the second information.

According to one aspect of the present disclosure, the above method is characterized in comprising:

transmitting Q first-type radio signal(s), Q being a positive integer;

herein, the first information is composed of Q piece(s) of first-type sub-information, and the Q first-type radio signal(s) comprises(comprise) the Q piece(s) of first-type sub-information respectively; the second information is determined jointly by the Q first-type radio signal(s) and the Q piece(s) of first-type sub-information.

According to one aspect of the present disclosure, the above method is characterized in comprising:

receiving a target-specific signal and determining whether the first node is in coverage according to target received quality of the target-specific signal.

According to one aspect of the present disclosure, the above method is characterized in comprising:

receiving a second radio signal;

herein, the first information and the second information are used for determining at least one of a time-domain resource or a spatial-domain resource occupied by the second radio signal.

According to one aspect of the present disclosure, the above method is characterized in that the first node is a UE.

According to one aspect of the present disclosure, the above method is characterized in that the first node is a relay node.

The present disclosure provides a method in a second node for wireless communications, comprising:

receiving first information and second information;

herein, the first information is used for indicating a first symbol set and a second symbol set; the first symbol set and the second symbol set respectively comprise a positive integer number of multicarrier symbol(s); each multicarrier symbol in the first symbol set corresponds to first-type symbols in a first time unit format, while each multicarrier symbol in the second symbol set corresponds to second-type symbols in a first time unit format; each of the first-type symbols comprises (a) downlink symbol(s), while each of the second-type symbols comprises (an) uplink symbol(s); the second information is used for indicating a first spatial Rx parameter group associated with the first symbol set; the first time unit format is indicated by a first signaling, or, the first time unit format is autonomously determined by a transmitter of the first information and the second information.

The present disclosure provides a method in a second node for wireless communications, comprising:

receiving first information and second information;

herein, the first information is used for indicating a first symbol set and a second symbol set; the first symbol set and the second symbol set respectively comprise a positive integer number of multicarrier symbol(s); each multicarrier symbol in the first symbol set corresponds to first-type symbols in a first time unit format, while each multicarrier symbol in the second symbol set corresponds to second-type symbols in a first time unit format; each of the first-type symbols comprises (a) downlink symbol(s), while each of the second-type symbols comprises (an) uplink symbol(s); the second information is used for indicating a first spatial Rx parameter group associated with the first symbol set; the first time unit format is indicated by a first signaling, or, the first time unit format is autonomously determined by a transmitter of the first information and the second information.

According to one aspect of the present disclosure, the above method is characterized in that a first time unit set is indicated by a second signaling; the first time unit set comprises a positive integer number of time unit(s); each time unit of the positive integer number of time unit(s) comprises a positive integer number of multicarrier symbol(s); the first symbol set is composed of multicarrier symbol(s) in the first time unit set corresponding to the first-type symbols in the first time unit format, while the second symbol set is composed of multicarrier symbol(s) in the first time unit set corresponding to the second-type symbols in the first time unit format.

According to one aspect of the present disclosure, the above method is characterized in that a first time unit set is determined by a transmitter of the first information and the second information autonomously; the first time unit set comprises a positive integer number of time unit(s); each time unit of the positive integer number of time unit(s) comprises a positive integer number of multicarrier symbol(s); the first symbol set is composed of multicarrier symbol(s) in the first time unit set corresponding to the first-type symbols in the first time unit format, while second symbol set is composed of multicarrier symbol(s) in the first time unit set corresponding to the second-type symbols in the first time unit format.

According to one aspect of the present disclosure, the above method is characterized in that when the transmitter of the first information and the second information are in coverage, the first time unit format is indicated by the first signaling; when the transmitter of the first information and the second information are out of coverage, the first time unit format is determined autonomously.

According to one aspect of the present disclosure, the above method is characterized in comprising:

receiving Q0 first-type radio signal(s) of Q first-type radio signal(s), both Q and Q0 being positive integers;

herein, each first-type radio signal of the Q first-type radio signal(s) comprises the first information and the second information.

According to one aspect of the present disclosure, the above method is characterized in comprising:

receiving Q0 first-type radio signal(s) of Q first-type radio signal(s), both Q and Q0 being positive integers;

herein, the first information is composed of Q piece(s) of first-type sub-information, and the Q first-type radio signal(s) comprises(comprise) the Q piece(s) of first-type sub-information respectively, while the second information is determined jointly by the Q first-type radio signal(s) and the Q piece(s) of first-type sub-information.

According to one aspect of the present disclosure, the above method is characterized in that receiving quality of a received target-specific signal is used by the transmitter of the first information and the second information for determining whether the transmitter of the first information and the second information are in coverage.

According to one aspect of the present disclosure, the above method is characterized in comprising:

transmitting a second radio signal;

herein, the first information and the second information are used for determining at least one of a time-domain resource or a spatial-domain resource occupied by the second radio signal.

According to one aspect of the present disclosure, the above method is characterized in that the second node is a UE.

According to one aspect of the present disclosure, the above method is characterized in that the second node is a relay node.

The present disclosure provides a method in a base station for wireless communications, comprising:

transmitting a first signaling, the first signaling being used for indicating a first time unit format;

herein, first information is used for indicating a first symbol set and a second symbol set; the first symbol set and the second symbol set respectively comprise a positive integer number of multicarrier symbol(s); each multicarrier symbol in the first symbol set corresponds to first-type symbols in the first time unit format, while each multicarrier symbol in the second symbol set corresponds to second-type symbols in the first time unit format; each of the first-type symbols comprises (a) downlink symbol(s), while each of the second-type symbols comprises (an) uplink symbol(s); second information is used for indicating a first spatial Rx parameter group associated with the first symbol set; the first information and the second information are transmitted by a receiver of the first signaling.

According to one aspect of the present disclosure, the above method is characterized in comprising:

transmitting a second signaling, the second signaling being used for indicating a first time unit set;

herein, the first time unit set comprises a positive integer number of time unit(s); each time unit of the positive integer number of time unit(s) comprises a positive integer number of multicarrier symbol(s); the first symbol set is composed of multicarrier symbol(s) in the first time unit set corresponding to the first-type symbols in the first time unit format, while the second symbol set is composed of multicarrier symbol(s) in the first time unit set corresponding to the second-type symbols in the first time unit format.

According to one aspect of the present disclosure, the above method is characterized in that when the receiver of the first signaling is in coverage, the first time unit format is indicated by the first signaling; when the receiver of the first signaling is out of coverage, the first time unit format is determined autonomously.

According to one aspect of the present disclosure, the above method is characterized in that each first-type radio signal of the Q first-type radio signal(s) comprises the first information and the second information; the Q is a positive integer.

According to one aspect of the present disclosure, the above method is characterized in that the first information is composed of Q piece(s) of first-type sub-information, and the Q first-type radio signal(s) comprises(comprise) the Q piece(s) of first-type sub-information respectively; the second information is determined jointly by the Q first-type radio signal(s) and the Q piece(s) of first-type sub-information; the Q is a positive integer.

According to one aspect of the present disclosure, the above method is characterized in comprising:

transmitting a target-specific signal and determining whether the receiver of the first signaling is in coverage according to target received quality of the target-specific signal.

The present disclosure provides a first node for wireless communications, comprising:

a first receiver: receiving a first signaling, the first signaling being used for indicating a first time unit format; and a first transmitter: transmitting first information and second information;

herein, the first information is used for indicating a first symbol set and a second symbol set; the first symbol set and the second symbol set respectively comprise a positive integer number of multicarrier symbol(s); each multicarrier symbol in the first symbol set corresponds to first-type symbols in the first time unit format, while each multicarrier symbol in the second symbol set corresponds to second-type symbols in the first time unit format; each of the first-type symbols comprises (a) downlink symbol(s), while each of the second-type symbols comprises (an) uplink symbol(s); the second information is used for indicating a first spatial Rx parameter group associated with the first symbol set.

The present disclosure provides a first node for wireless communications, comprising:

a first receiver: autonomously determining a first time unit format; and a first transmitter: transmitting first information and second information;

herein, the first information is used for indicating a first symbol set and a second symbol set; the first symbol set and the second symbol set respectively comprise a positive integer number of multicarrier symbol(s); each multicarrier symbol in the first symbol set corresponds to first-type symbols in the first time unit format, while each multicarrier symbol in the second symbol set corresponds to second-type symbols in the first time unit format; each of the first-type symbols comprises (a) downlink symbol(s), while each of the second-type symbols comprises (an) uplink symbol(s);

the second information is used for indicating a first spatial Rx parameter group associated with the first symbol set.

According to one aspect of the present disclosure, the above first node is characterized in comprising:

the first receiver, receiving a second signaling, the second signaling being used for indicating a first time unit set;

herein, the first time unit set comprises a positive integer number of time unit(s); each time unit of the positive integer number of time unit(s) comprises a positive integer number of multicarrier symbol(s); the first symbol set is composed of multicarrier symbol(s) in the first time unit set corresponding to the first-type symbols in the first time unit format, while the second symbol set is composed of multicarrier symbol(s) in the first time unit set corresponding to the second-type symbols in the first time unit format.

According to one aspect of the present disclosure, the above first node is characterized in comprising:

the first receiver, autonomously determining a first time unit set;

herein, the first time unit set comprises a positive integer number of time unit(s); each time unit of the positive integer number of time unit(s) comprises a positive integer number of multicarrier symbol(s); the first symbol set is composed of multicarrier symbol(s) in the first time unit set corresponding to the first-type symbols in the first time unit format, while the second symbol set is composed of multicarrier symbol(s) in the first time unit set corresponding to the second-type symbols in the first time unit format.

According to one aspect of the present disclosure, the above first node is characterized in comprising:

the first receiver, determining whether the first node is in coverage;

herein, when the first node is in coverage, the first time unit format is indicated by the first signaling; when the first node is out of coverage, the first time unit format is determined autonomously.

According to one aspect of the present disclosure, the above first node is characterized in comprising:

the first transmitter, transmitting Q first-type radio signal(s), Q being a positive integer;

herein, each of the Q first-type radio signal(s) comprises the first information and the second information.

According to one aspect of the present disclosure, the above first node is characterized in comprising:

the first transmitter, transmitting Q first-type radio signal(s), Q being a positive integer;

herein, the first information is composed of Q piece(s) of first-type sub-information; and the Q first-type radio signal(s) comprises(comprise) the Q piece(s) of first-type sub-information respectively; the second information is determined jointly by the Q first-type radio signal(s) and the Q piece(s) of first-type sub-information.

According to one aspect of the present disclosure, the above first node is characterized in comprising:

the first receiver, receiving a target-specific signal and determining whether the first node is in coverage according to target received quality of the target-specific signal.

According to one aspect of the present disclosure, the above first node is characterized in comprising:

the first receiver, receiving a second radio signal;

herein, the first information and the second information are used for determining at least one of a time-domain resource or a spatial-domain resource occupied by the second radio signal.

According to one aspect of the present disclosure, the above first node is characterized in that the first node is a UE.

According to one aspect of the present disclosure, the above first node is characterized in that the first node is a relay node.

The present disclosure provides a second node for wireless communications, comprising:

a second receiver: receiving first information and second information;

herein, the first information is used for indicating a first symbol set and a second symbol set; the first symbol set and the second symbol set respectively comprise a positive integer number of multicarrier symbol(s); each multicarrier symbol in the first symbol set corresponds to first-type symbols in a first time unit format, while each multicarrier symbol in the second symbol set corresponds to second-type symbols in a first time unit format; each of the first-type symbols comprises (a) downlink symbol(s), while each of the second-type symbols comprises (an) uplink symbol(s); the second information is used for indicating a first spatial Rx parameter group associated with the first symbol set; and the first time unit format is indicated by a first signaling.

The present disclosure provides a second node for wireless communications, comprising:

a second receiver: receiving first information and second information;

herein, the first information is used for indicating a first symbol set and a second symbol set; the first symbol set and the second symbol set respectively comprise a positive integer number of multicarrier symbol(s); each multicarrier symbol in the first symbol set corresponds to first-type symbols in a first time unit format, while each multicarrier symbol in the second symbol set corresponds to second-type symbols in a first time unit format; each of the first-type symbols comprises (a) downlink symbol(s), while each of the second-type symbols comprises (an) uplink symbol(s); the second information is used for indicating a first spatial Rx parameter group associated with the first symbol set; and the first time unit format is autonomously determined by a transmitter of the first information and the second information.

According to one aspect of the present disclosure, the second node is characterized in that a first time unit set is indicated by a second signaling; the first time unit set comprises a positive integer number of time unit(s); each time unit of the positive integer number of time unit(s) comprises a positive integer number of multicarrier symbol(s); the first symbol set is composed of multicarrier symbol(s) in the first time unit set corresponding to the first-type symbols in the first time unit format, while the second symbol set is composed of multicarrier symbol(s) in the first time unit set corresponding to the second-type symbols in the first time unit format.

According to one aspect of the present disclosure, the second node is characterized in that a first time unit set is determined by a transmitter of the first information and the second information autonomously; the first time unit set comprises a positive integer number of time unit(s); each time unit of the positive integer number of time unit(s) comprises a positive integer number of multicarrier symbol(s); the first symbol set is composed of multicarrier symbol(s) in the first time unit set corresponding to the first-type symbols in the first time unit format, while the second symbol set is composed of multicarrier symbol(s) in the first time unit set corresponding to the second-type symbols in the first time unit format.

According to one aspect of the present disclosure, the second node is characterized in that when the transmitter of the first information and the second information are in coverage, the first time unit format is indicated by the first signaling; when the transmitter of the first information and the second information are out of coverage, the first time unit format is determined autonomously.

According to one aspect of the present disclosure, the above second node is characterized in comprising:

the second receiver, receiving Q0 first-type radio signal(s) of Q first-type radio signal(s), both Q and Q0 being positive integers;

herein, each first-type radio signal of the Q first-type radio signal(s) comprises the first information and the second information.

According to one aspect of the present disclosure, the above second node is characterized in comprising:

the second receiver, receiving Q0 first-type radio signal(s) of Q first-type radio signal(s), both Q and Q0 being positive integers;

herein, the first information is composed of Q piece(s) of first-type sub-information, and the Q first-type radio signal(s) comprises(comprise) the Q piece(s) of first-type sub-information respectively, while the second information is determined jointly by the Q first-type radio signal(s) and the Q piece(s) of first-type sub-information.

According to one aspect of the present disclosure, the above second node is characterized in that receiving quality of a received target-specific signal is used by the transmitter of the first information and the second information for determining whether the transmitter of the first information and the second information are in coverage.

According to one aspect of the present disclosure, the above second node is characterized in comprising:

a second transmitter, transmitting a second radio signal;

herein, the first information and the second information are used for determining at least one of a time-domain resource or a spatial-domain resource occupied by the second radio signal.

According to one aspect of the present disclosure, the above second node is characterized in that the second node is a UE.

According to one aspect of the present disclosure, the above second node is characterized in that the second node is a relay node.

The present disclosure provides a base station for wireless communications, comprising:

a third transmitter, transmitting a first signaling, the first signaling being used for indicating a first time unit format;

herein, first information is used for indicating a first symbol set and a second symbol set; the first symbol set and the second symbol set respectively comprise a positive integer number of multicarrier symbol(s); each multicarrier symbol in the first symbol set corresponds to first-type symbols in the first time unit format, while each multicarrier symbol in the second symbol set corresponds to second-type symbols in the first time unit format; each of the first-type symbols comprises (a) downlink symbol(s), while each of the second-type symbols comprises (an) uplink symbol(s); second information is used for indicating a first spatial Rx parameter group associated with the first symbol set; the first information and the second information are transmitted by a receiver of the first signaling.

According to one aspect of the present disclosure, the above base station is characterized in comprising:

the third transmitter, transmitting a second signaling, the second signaling being used for indicating a first time unit set;

herein, the first time unit set comprises a positive integer number of time unit(s); each time unit of the positive integer number of time unit(s) comprises a positive integer number of multicarrier symbol(s); the first symbol set is composed of multicarrier symbol(s) in the first time unit set corresponding to the first-type symbols in the first time unit format, while the second symbol set is composed of multicarrier symbol(s) in the first time unit set corresponding to the second-type symbols in the first time unit format.

According to one aspect of the present disclosure, the above base station is characterized in that when the receiver of the first signaling is in coverage, the first time unit format is indicated by the first signaling; when the receiver of the first signaling is out of coverage, the first time unit format is determined autonomously.

According to one aspect of the present disclosure, the above base station is characterized in that each first-type radio signal of the Q first-type radio signal(s) comprises the first information and the second information; the Q is a positive integer.

According to one aspect of the present disclosure, the above base station is characterized in that the first information is composed of Q piece(s) of first-type sub-information; and the Q first-type radio signal(s) comprises(comprise) the Q piece(s) of first-type sub-information respectively; the second information is determined jointly by the Q first-type radio signal(s) and the Q piece(s) of first-type sub-information; the Q is a positive integer.

According to one aspect of the present disclosure, the above base station is characterized in comprising:

the third transmitter, transmitting a target-specific signal and determining whether the receiver of the first signaling is in coverage according to target received quality of the target-specific signal.

In one embodiment, the present disclosure is advantageous in the following aspects:

The present disclosure associates a time-domain resource with a spatial-domain resource.

The present disclosure associates a first symbol set and a first spatial Rx parameter group.

The present disclosure enables sidelink communication in an idle beam direction of a first symbol set, thus acquiring more opportunities of sidelink communication.

For the first node in coverage in the present disclosure, the first information and the second information are configured by a base station.

For the first node out of coverage in the present disclosure, the first information and the second information are determined by the first node autonomously.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
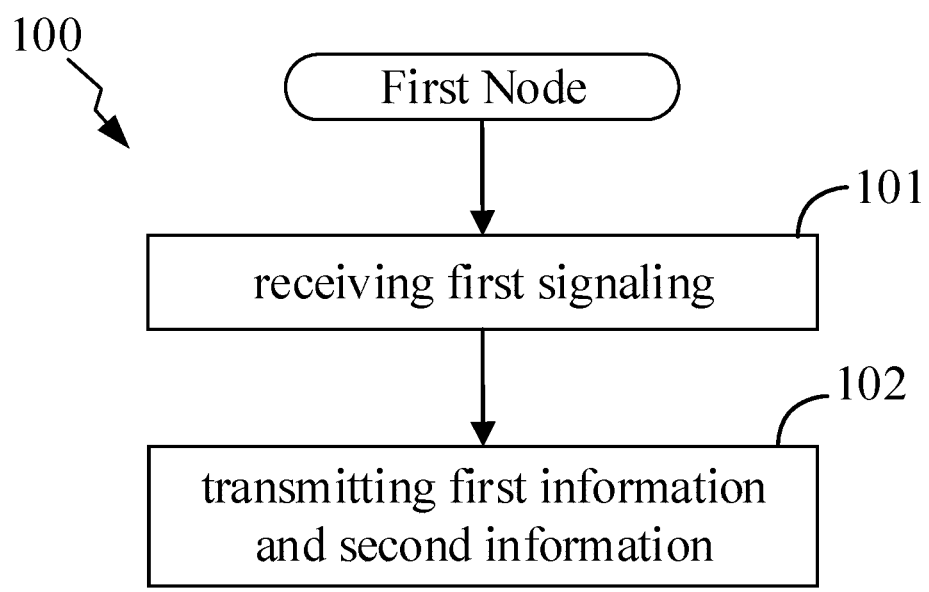
FIG. 1 illustrates a flowchart of transmission of a first signaling, first information and second information according to one embodiment of the present disclosure.

Embodiment 1 illustrates a flowchart of transmission of a first signaling, first information and second information, as shown in FIG. 1.

In Embodiment 1, when a first node in the present disclosure is in coverage, the first node receives a first signaling, the first signaling being used for indicating a first time unit format in the present disclosure; and transmits first information and second information; the first information is used for indicating a first symbol set and a second symbol set in the present disclosure; the first symbol set and the second symbol set respectively comprise a positive integer number of multicarrier symbol(s); each multicarrier symbol in the first symbol set corresponds to first-type symbols in the first time unit format, while each multicarrier symbol in the second symbol set corresponds to second-type symbols in the first time unit format; the second information is used for indicating a first spatial Rx parameter group associated with the first symbol set.

In one embodiment, the first time unit format comprises Downlink symbols, Uplink symbols and Flexible symbols.

In one embodiment, the first time unit format comprises first-type symbols and second-type symbols.

In one embodiment, the first-type symbols comprise Flexible symbols.

In one embodiment, the second-type symbols comprise Flexible symbols.

In one embodiment, the Flexible symbols are used for transmitting in Downlink.

In one embodiment, the Flexible symbols are used for transmitting in Uplink.

In one embodiment, the Flexible symbols are used for transmitting in Sidelink.

In one embodiment, in a slot comprised in an uplink subframe, the Flexible symbols are used by the first node for transmitting.

In one embodiment, in a slot comprised in an uplink subframe, the Flexible symbols are used by the first node for receiving.

In one embodiment, the multicarrier symbol is at least one of a Frequency Division Multiple Access (FDMA) symbol, an Orthogonal Frequency Division Multiplexing (OFDM) symbol, a Single-Carrier Frequency Division Multiple Access (SC-FDMA) symbol, a Discrete Fourier Transform Spread Orthogonal Frequency Division Multiplexing (DFTS-OFDM) symbol, a Filter Bank Multi-Carrier (FBMC) symbol, or an Interleaved Frequency Division Multiple Access (IFDMA) symbol.

In one embodiment, the first signaling is used for indicating the first time unit format.

In one embodiment, when the first node is in coverage, the first signaling is used for indicating the first time unit format.

In one embodiment, the first signaling is dynamically configured.

In one embodiment, the first signaling is semi-statically configured.

In one embodiment, the first signaling comprises all or part of a higher-layer signaling.

In one embodiment, the first signaling comprises all or part of a Radio Resource Control (RRC) Layer signaling.

In one embodiment, the first signaling comprises one or more fields in an RRC Information Element (IE).

In one embodiment, the first signaling comprises all or part of a Multimedia Access Control (MAC) Layer signaling.

In one embodiment, the first signaling comprises one or more fields in a MAC Control Element (CE).

In one embodiment, the first signaling comprises one or more fields in a Physical (PHY) Layer.

In one embodiment, the first signaling comprises one or more fields in a piece of Downlink Control Information (DCI).

In one embodiment, the first signaling is transmitted on a Physical Broadcast Channel (PBCH).

In one embodiment, the first signaling comprises a first control bit block, the first control bit block comprising a positive integer number of sequentially arranged bits.

In one embodiment, the first control bit block comprises one or more fields in a Master Information Block (MIB).

In one embodiment, the first control bit block comprises one or more fields in a Master Information Block-Sidelink (MIB-SL).

In one embodiment, the first control bit block comprises one or more fields in a System Information Block (SIB).

In one embodiment, the first signaling is obtained by all or part of bits in the first control bit block sequentially through first-class scrambling, transport-block-level (TB-level) Cyclic Redundancy Check (CRC) Attachment, Channel Coding, Rate Matching, second-class scrambling, Modulation and Layer Mapping, Transform Precoding and Precoding, Mapping to Physical Resources, and Baseband Signal Generation, Modulation and Upconversion.

In one embodiment, the first signaling is an output by all or part of bits in the first control bit block through at least one of Segmentation Channel Coding, Rate Matching, Concatenation, scrambling, modulation, layer mapping, Spreading Transform Precoding, Precoding, Mapping to Physical Resources, Baseband Signal Generation, or Modulation and Upconversion.

In one embodiment, the first control bit block comprises the first time unit format.

In one embodiment, the first time unit format is used for generating a scrambling sequence of the first control bit block.

In one embodiment, the first signaling comprises a slot format indicator (SFI).

In one embodiment, the first signaling takes one or more fields in a TDD-UL-DL-Config Information Element (IE) in 3GPP TS38.331 as reference.

In one embodiment, the first signaling takes one or more fields in a DCI format 2_0 in 3GPP TS38.212 as reference.

In one embodiment, the first signaling is transmitted through a PDCCH identified by System Information Radio Network Temporary Identity (SI-RNTI).

In one embodiment, the first signaling is transmitted through a PDCCH identified by Slot Format Indicator-Radio Network Temporary Identity (SFI-RNTI).

In one embodiment, the first signaling is transmitted through a PDCCH identified by Cell-Radio Network Temporary Identity (C-RNTI).

In one embodiment, the first signaling is transmitted through a PDCCH scrambled by SI-RNTI based on Cyclic Redundancy Check (CRC).

In one embodiment, the first signaling is transmitted through a PDCCH scrambled by SFI-RNTI based on Cyclic Redundancy Check (CRC).

In one embodiment, the first signaling is transmitted through a PDCCH scrambled by C-RNTI based on Cyclic Redundancy Check (CRC).

In one embodiment, a transmitter of the first signaling is a Synchronization Reference Source for the first node.

In one embodiment, the Synchronization Reference Source for the first node comprises at least one of a Global Navigation Satellite System (GNSS), a cell and a Synchronization Reference User Equipment (SyncRefUE).

In one embodiment, for the SyncRefUE, refer to 3GPP TS36.331.

In one embodiment, the first information comprises Time-Division Duplex (TDD) uplink and downlink configurations.

In one embodiment, the first information comprises a Slot Format Indicator (SFI).

In one embodiment, the first information comprises one or more fields in a TDD-UL-DL-Config IE in 3GPP TS38.331.

In one embodiment, the first information comprises one or more fields in a DCI format 2_0 in 3GPP TS38.212.

In one embodiment, the first information comprises a first data bit block, the first data bit block comprising a positive integer number of sequentially arranged bits.

In one embodiment, the first data bit block comprises one or more fields in a MIB.

In one embodiment, the first data bit block comprises one or more fields in a MIB-SL.

In one embodiment, the first data bit block comprises one or more fields in a SIB.

In one embodiment, the first data bit block comprises all or part of bits in a Transport Block (TB).

In one embodiment, the first data bit block comprises all or part of bits in a Code Block (CB).

In one embodiment, the first information is obtained by all or part of bits in the first data bit block sequentially through TB-level Cyclic Redundancy Check (CRC) Attachment, Low-Density Parity-Check Code (LDPC) base graph selection, Code Block Segmentation, CB-level CRC Attachment, Channel Coding, Rate Matching, Code Block Concatenation, scrambling, Modulation, Layer Mapping, Antenna Port Mapping, Mapping to Virtual Resource Blocks, Mapping from Virtual to Physical Resource Blocks, Baseband Signal Generation, and Modulation and Upconversion.

In one embodiment, the first information is an output by all or part of bits in the first data bit block through at least one of TB-level Cyclic Redundancy Check (CRC) Attachment, Low-Density Parity-Check Code (LDPC) base graph selection, Code Block Segmentation, CB-level CRC Attachment, Channel Coding, Rate Matching, Code Block Concatenation, scrambling, Modulation, Layer Mapping, Antenna Port Mapping, Mapping to Virtual Resource Blocks, Mapping from Virtual to Physical Resource Blocks, Baseband Signal Generation, and Modulation and Upconversion.

In one embodiment, the first data bit block comprises the first information.

In one embodiment, the first information indicates the first symbol set and the second symbol set with a bitmap.

In one embodiment, the second information comprises a first spatial Rx parameter group, the first spatial Rx parameter group comprising a positive integer number of spatial Rx parameter(s).

In one embodiment, the second information comprises a second data bit block, the second data bit block comprises a positive integer number of sequentially arranged bits.

In one embodiment, the second data bit block comprises one or more fields in a MIB.

In one embodiment, the second data bit block comprises one or more fields in a MIB-SL.

In one embodiment, the second data bit block comprises one or more fields in a SIB.

In one embodiment, the second data bit block comprises all or part of bits in a TB.

In one embodiment, the second data bit block comprises all or part of bits in a CB.

In one embodiment, the second information is obtained by all or part of bits in the second data bit block sequentially through TB-level Cyclic Redundancy Check (CRC) Attachment, Low-Density Parity-Check Code (LDPC) base graph selection, Code Block Segmentation, CB-level CRC Attachment, Channel Coding, Rate Matching, Code Block Concatenation, scrambling, Modulation, Layer Mapping, Antenna Port Mapping, Mapping to Virtual Resource Blocks, Mapping from Virtual to Physical Resource Blocks, Baseband Signal Generation, and Modulation and Upconversion.

In one embodiment, the second information is an output by all or part of bits in the second data bit block through at least one of TB-level Cyclic Redundancy Check (CRC) Attachment, Low-Density Parity-Check Code (LDPC) base graph selection, Code Block Segmentation, CB-level CRC Attachment, Channel Coding, Rate Matching, Code Block Concatenation, scrambling, Modulation, Layer Mapping, Antenna Port Mapping, Mapping to Virtual Resource Blocks, Mapping from Virtual to Physical Resource Blocks, Baseband Signal Generation, and Modulation and Upconversion.

In one embodiment, the second data bit block comprises the second information.

In one embodiment, the second information indicates the first spatial Rx parameter group associated with the first symbol set.

Embodiment 2

Figure 2:
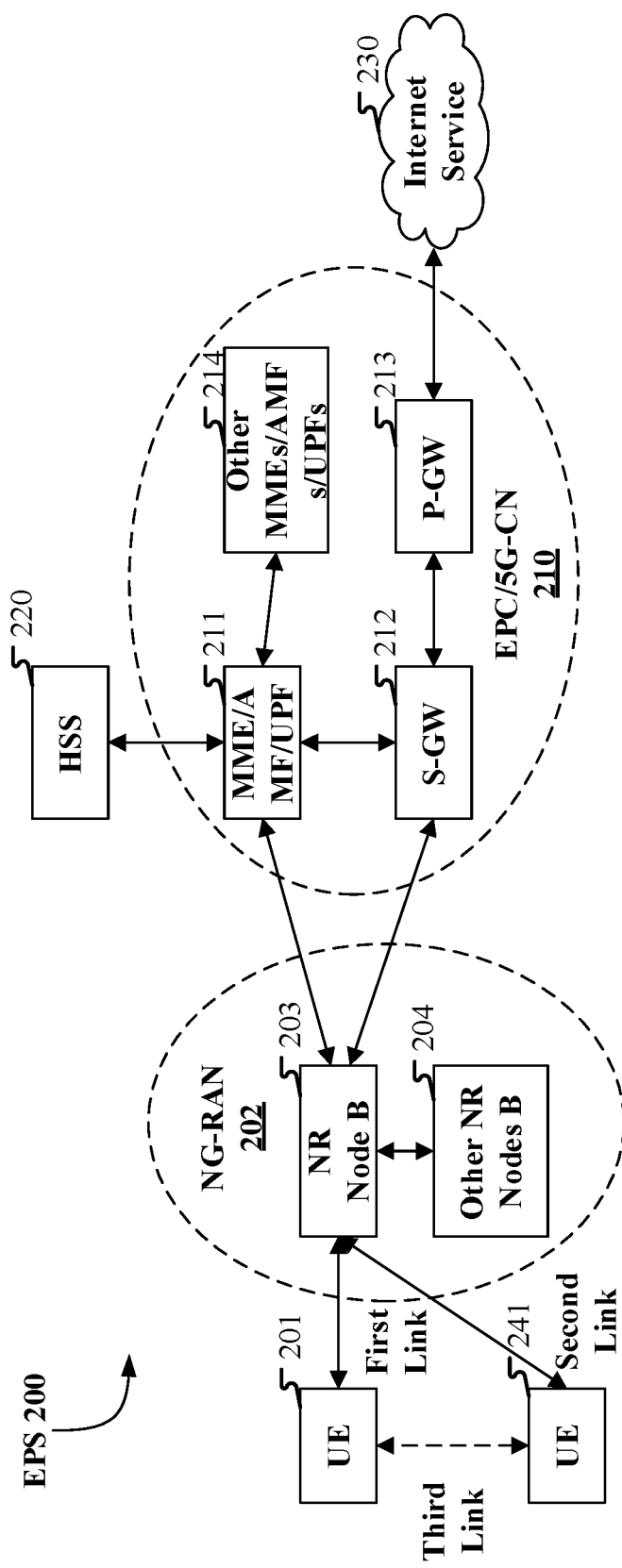
FIG. 2 illustrates a schematic diagram of network architecture according to one embodiment of the present disclosure.

Embodiment 2 illustrates a schematic diagram of a network architecture, as shown in FIG. 2.

FIG. 2 is a diagram illustrating a network architecture 200 of 5G NR, Long-Term Evolution (LTE) and Long-Term Evolution Advanced (LTE-A) systems. The NR 5G or LTE network architecture 200 may be called an Evolved Packet System (EPS) 200 or other appropriate terms. The EPS 200 may comprise one or more UEs 201/241, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA) phones, Satellite Radios, non-terrestrial base station communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the first node in the present disclosure comprises the UE 201.

In one embodiment, the UE in the present disclosure comprises the UE 201.

In one embodiment, the second node in the present disclosure comprises the UE 241.

In one embodiment, the UE in the present disclosure comprises the UE 241.

In one embodiment, the base station in the present disclosure comprises the gNB 203.

In one embodiment, the UE 201 supports sidelink communication.

In one embodiment, the UE 241 supports sidelink communication.

In one embodiment, the UE 201 supports beamforming-based sidelink communication.

In one embodiment, the UE 241 supports beamforming-based sidelink communication.

In one embodiment, the gNB 203 supports beamforming-based downlink transmission.

In one embodiment, the UE 201 supports Massive MIMO-based sidelink communication.

In one embodiment, the UE 241 supports Massive MIMO-based sidelink communication.

In one embodiment, the gNB 203 supports Massive MIMO-based downlink transmission.

In one embodiment, a transmitter of a target-specific signal in the present disclosure comprises the Global Navigation Satellite System (GNSS).

In one embodiment, a transmitter of a target-specific signal in the present disclosure comprises the gNB 203.

In one embodiment, the UE 201 supports the action of determining whether the UE 201 is within the coverage of the present disclosure based on the target-specific signal.

In one embodiment, the UE 201 supports the action of determining transmission resources for sidelink based on the first time unit format and the first time unit set in the present disclosure.

In one embodiment, the UE 241 supports the action of determining transmission resources for sidelink based on the first time unit format and the first time unit set in the present disclosure.

In one embodiment, a receiver of the first signaling in the present disclosure comprises the UE 201.

In one embodiment, a receiver of the first information and the second information in the present disclosure comprises the UE 241.

Embodiment 3

Figure 3:
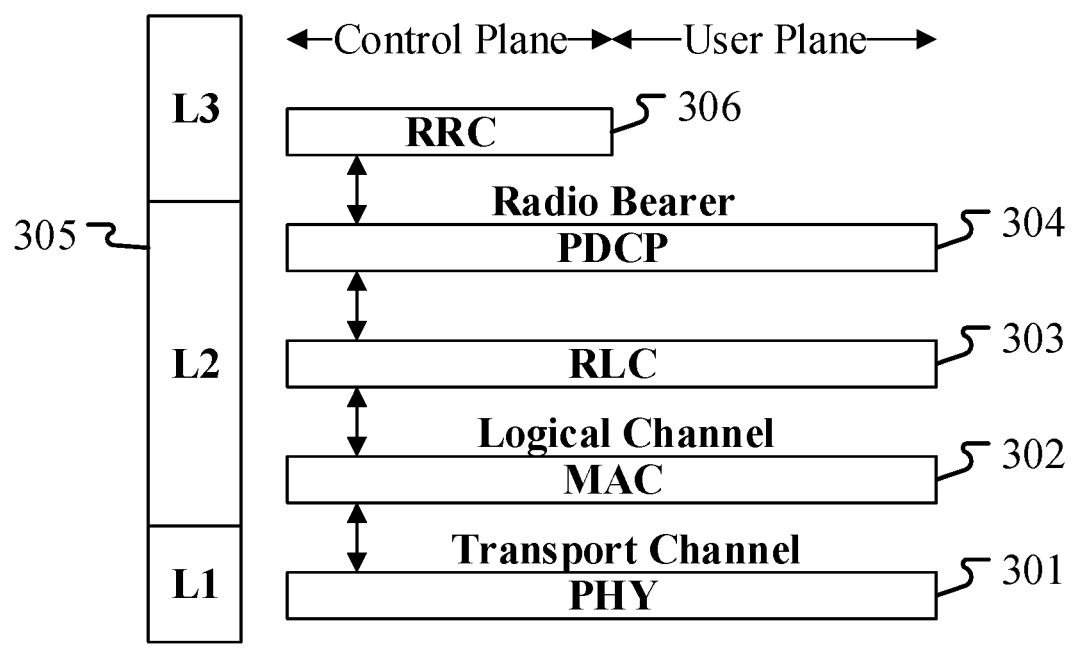
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3.

FIG. 3 is a schematic diagram illustrating a radio protocol architecture of a user plane and a control plane. In FIG. 3, the radio protocol architecture for a UE and a base station (gNB, eNB) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the base station via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the base stations of the network side. Although not described in FIG. 3, the UE may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between base stations. The RLC sublayer 303 provides segmentation and reassembling of a higher-layer packet, retransmission of a lost packet, and reordering of a packet so as to compensate disordered receiving caused by HARQ. The MAC sublayer 302 provides multiplexing between a logical channel and a transport channel. The MAC sublayer 302 is also responsible for allocating between UEs various radio resources (i.e., resource blocks) in a cell. The MAC sublayer 302 is also in charge of HARQ operation. In the control plane, the radio protocol architecture of the UE and the base station is almost the same as the radio protocol architecture in the user plane on the PHY 301 and the L2 305, but there is no header compression for the control plane. The control plane also comprises an RRC sublayer 306 in the layer 3 (L3). The RRC sublayer 306 is responsible for acquiring radio resources (i.e., radio bearer) and configuring the lower layer using an RRC signaling between the base station and the UE.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the radio protocol architecture in FIG. 3 is applicable to the base station in the present disclosure.

In one embodiment, the target-specific signal in the present disclosure is generated by the PHY 301.

In one embodiment, the first signaling in the present disclosure is generated by the PHY 301.

In one embodiment, the first signaling in the present disclosure is generated by the RRC sublayer 306.

In one embodiment, the first control bit block in the present disclosure is generated by the RRC sublayer 306.

In one embodiment, the first control bit block in the present disclosure is transferred from the L2 layer to the PHY 301.

In one embodiment, the second signaling in the present disclosure is generated by the PHY 301.

In one embodiment, the second signaling in the present disclosure is generated by the RRC sublayer 306.

In one embodiment, the second control bit block in the present disclosure is generated by the RRC sublayer 306.

In one embodiment, the second control bit block in the present disclosure is transferred from the L2 layer to the PHY 301.

In one embodiment, the first information in the present disclosure is generated by the RRC sublayer 306.

In one embodiment, the first information in the present disclosure is generated by the MAC sublayer 302.

In one embodiment, the first information in the present disclosure is generated by the PHY 301.

In one embodiment, the second information in the present disclosure is generated by the RRC sublayer 306.

In one embodiment, the second information in the present disclosure is generated by the MAC sublayer 302.

In one embodiment, the second information in the present disclosure is generated by the PHY 301.

In one embodiment, the first data bit block in the present disclosure is generated by the RRC sublayer 306.

In one embodiment, the first data bit block in the present disclosure is transferred from the L2 layer to the PHY 301.

In one embodiment, the second data bit block in the present disclosure is generated by the RRC sublayer 306.

In one embodiment, the second data bit block in the present disclosure is transferred from the L2 layer to the PHY 301.

In one embodiment, the third data bit block in the present disclosure is generated by the RRC sublayer 306.

In one embodiment, the third data bit block in the present disclosure is transferred from the L2 layer to the PHY 301.

In one embodiment, the Q first-type radio signal(s) in the present disclosure is(are) generated by the PHY 301.

In one embodiment, the Q piece(s) of first-type sub-information in the present disclosure is(are) generated by the RRC sublayer 306.

In one embodiment, the Q piece(s) of first-type sub-information in the present disclosure is(are) generated by the MAC sublayer 302.

In one embodiment, the Q piece(s) of first-type sub-information in the present disclosure is(are) generated by the PHY 301.

In one embodiment, the Q piece(s) of first-type sub-information in the present disclosure is(are) transferred from the L2 layer to the PHY 301.

In one embodiment, the Q piece(s) of first-type sub-information in the present disclosure is(are) transferred from the MAC sublayer 302 to the PHY 301.

In one embodiment, the second radio signal in the present disclosure is generated by the PHY 301.

In one embodiment, the second data bit block in the present disclosure is generated by the RRC sublayer 306.

In one embodiment, the second data bit block in the present disclosure is transferred from the L2 layer to the PHY 301.

Embodiment 4

Figure 4:
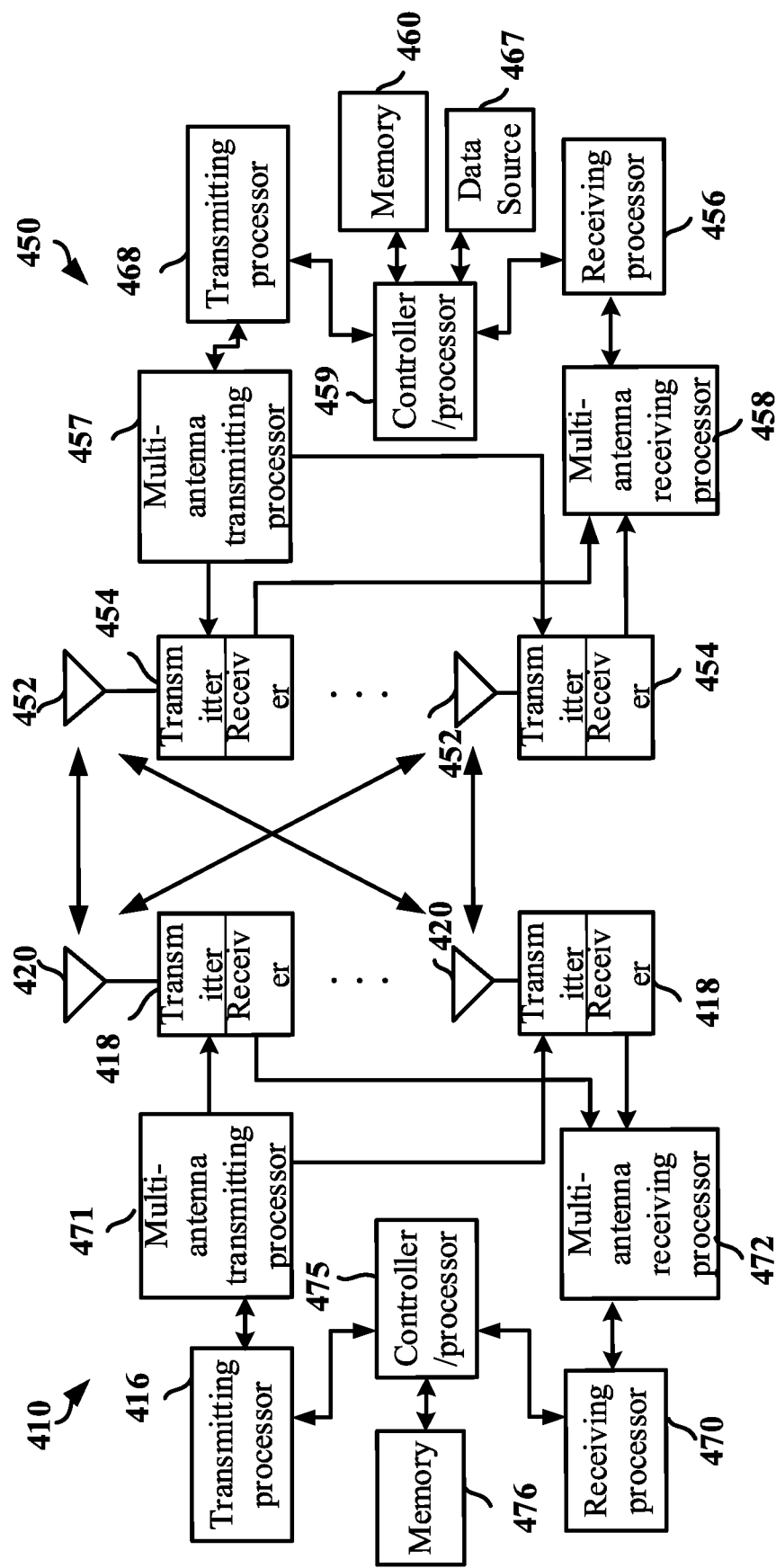
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 implements the functionality of the L2 layer. In a transmission from the first communication device 410 to the second communication device 450, the controller/processor 475 provides header compression, encryption, packet segmentation and reordering, and multiplexing between a logical channel and a transport channel, and radio resource allocation of the second communication device 450 based on various priorities. The controller/processor 475 is also in charge of a retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and constellation mapping corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In a transmission from the first communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In one embodiment, the base station in the present disclosure comprises the first communication device 410, while the first node in the present disclosure comprises the second communication device 450.

In one subembodiment, the first node is a UE.

In one subembodiment, the first node is a relay node.

In one subembodiment, the first communication device 410 comprises at least one controller/prcocessor; the at least one controller/processor is in charge of HARQ operation.

In one subembodiment, the second communication device 450 comprises at least one controller/prcocessor; the at least one controller/processor is in charge of performing error detection using ACK and/or NACK protocols to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resource allocation of the first communication device 410 so as to provide the L2 layer functions used for the user plane and the control plane. The controller/processor 459 is also responsible for HARQ operation, a retransmission of a lost packet, and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated parallel streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. The controller/processor 475 provides de-multiplexing between a transport channel and a logical channel, packet reassembling, decrypting, header decompression, control signal processing so as to recover a higher-layer packet from the second communication device (UE) 450. The higher-layer packet coming from the controller/processor 475 may be provided to the core network.

In one embodiment, the first node in the present disclosure comprises the second communication device 450, while the second node in the present disclosure comprises the first communication device 410.

In one subembodiment, the first node and the second node are UEs, respectively.

In one subembodiment, the first node is a relay node, while the second node is a UE.

In one embodiment, the second communication device 450 comprises at least one processor and at least one memory, the at least one memory comprises computer program codes; the at least one memory and the computer program codes are configured to be used in collaboration with the at least one processor, the second communication device 450 at least receives the first signaling in the present disclosure, the first signaling being used for indicating the first time unit format in the present disclosure; and transmits the first information and the second information in the present disclosure; the first information is used for indicating a first symbol set and a second symbol set; the first symbol set and the second symbol set respectively comprise a positive integer number of multicarrier symbol(s); each multicarrier symbol in the first symbol set corresponds to first-type symbols in the first time unit format, while each multicarrier symbol in the second symbol set corresponds to second-type symbols in the first time unit format; each of the first-type symbols comprises (a) downlink symbol(s), while each of the second-type symbols comprises (an) uplink symbol(s); the second information is used for indicating a first spatial Rx parameter group associated with the first symbol set.

In one embodiment, the second communication device 450 comprises a memory that stores computer readable instruction program, the computer readable instruction program generates actions when executed by at least one processor, which include: receiving the first signaling in the present disclosure, the first signaling being used for indicating the first time unit format in the present disclosure; and transmitting the first information and the second information in the present disclosure; the first information is used for indicating a first symbol set and a second symbol set; the first symbol set and the second symbol set respectively comprise a positive integer number of multicarrier symbol(s); each multicarrier symbol in the first symbol set corresponds to first-type symbols in the first time unit format, while each multicarrier symbol in the second symbol set corresponds to second-type symbols in the first time unit format; each of the first-type symbols comprises (a) downlink symbol(s), while each of the second-type symbols comprises (an) uplink symbol(s); the second information is used for indicating a first spatial Rx parameter group associated with the first symbol set.

In one embodiment, the second communication device 450 comprises at least one processor and at least one memory, the at least one memory comprises computer program codes; the at least one memory and the computer program codes are configured to be used in collaboration with the at least one processor, the second communication device 450 at least autonomously determines the first time unit format in the present disclosure; and transmits the first information and the second information in the present disclosure; the first information is used for indicating a first symbol set and a second symbol set; the first symbol set and the second symbol set respectively comprise a positive integer number of multicarrier symbol(s); each multicarrier symbol in the first symbol set corresponds to first-type symbols in the first time unit format, while each multicarrier symbol in the second symbol set corresponds to second-type symbols in the first time unit format; each of the first-type symbols comprises (a) downlink symbol(s), while each of the second-type symbols comprises (an) uplink symbol(s); the second information is used for indicating a first spatial Rx parameter group associated with the first symbol set.

In one embodiment, the second communication device 450 comprises a memory that stores computer readable instruction program, the computer readable instruction program generates actions when executed by at least one processor, which include: autonomously determining the first time unit format in the present disclosure; and transmitting the first information and the second information in the present disclosure; the first information is used for indicating a first symbol set and a second symbol set; the first symbol set and the second symbol set respectively comprise a positive integer number of multicarrier symbol(s); each multicarrier symbol in the first symbol set corresponds to first-type symbols in the first time unit format, while each multicarrier symbol in the second symbol set corresponds to second-type symbols in the first time unit format; each of the first-type symbols comprises (a) downlink symbol(s), while each of the second-type symbols comprises (an) uplink symbol(s); the second information is used for indicating a first spatial Rx parameter group associated with the first symbol set.

In one embodiment, the first communication device 410 comprises at least one processor and at least one memory, the at least one memory comprises computer program codes; the at least one memory and the computer program codes are configured to be used in collaboration with the at least one processor. The first communication device 410 at least receives the first information and the second information in the present disclosure; the first information is used for indicating a first symbol set and a second symbol set; the first symbol set and the second symbol set respectively comprise a positive integer number of multicarrier symbol(s); each multicarrier symbol in the first symbol set corresponds to first-type symbols in a first time unit format, while each multicarrier symbol in the second symbol set corresponds to second-type symbols in a first time unit format; each of the first-type symbols comprises (a) downlink symbol(s), while each of the second-type symbols comprises (an) uplink symbol(s); the second information is used for indicating a first spatial Rx parameter group associated with the first symbol set; the first time unit format is indicated by a first signaling.

In one embodiment, the first communication device 410 comprises a memory that stores computer readable instruction program, the computer readable instruction program generates an action when executed by at least one processor, which includes: receiving the first information and the second information in the present disclosure; the first information is used for indicating a first symbol set and a second symbol set; the first symbol set and the second symbol set respectively comprise a positive integer number of multicarrier symbol(s); each multicarrier symbol in the first symbol set corresponds to first-type symbols in a first time unit format, while each multicarrier symbol in the second symbol set corresponds to second-type symbols in a first time unit format; each of the first-type symbols comprises (a) downlink symbol(s), while each of the second-type symbols comprises (an) uplink symbol(s); the second information is used for indicating a first spatial Rx parameter group associated with the first symbol set; the first time unit format is indicated by a first signaling.

In one embodiment, the first communication device 410 comprises at least one processor and at least one memory, the at least one memory comprises computer program codes; the at least one memory and the computer program codes are configured to be used in collaboration with the at least one processor. The first communication device 410 at least receives the first information and the second information in the present disclosure; the first information is used for indicating a first symbol set and a second symbol set; the first symbol set and the second symbol set respectively comprise a positive integer number of multicarrier symbol(s); each multicarrier symbol in the first symbol set corresponds to first-type symbols in a first time unit format, while each multicarrier symbol in the second symbol set corresponds to second-type symbols in a first time unit format; each of the first-type symbols comprises (a) downlink symbol(s), while each of the second-type symbols comprises (an) uplink symbol(s); the second information is used for indicating a first spatial Rx parameter group associated with the first symbol set; the first time unit format is autonomously determined by a transmitter of the first information and the second information.

In one embodiment, the first communication device 410 comprises a memory that stores computer readable instruction program, the computer readable instruction program generates an action when executed by at least one processor, which includes: receiving the first information and the second information in the present disclosure; the first information is used for indicating a first symbol set and a second symbol set; the first symbol set and the second symbol set respectively comprise a positive integer number of multicarrier symbol(s); each multicarrier symbol in the first symbol set corresponds to first-type symbols in a first time unit format, while each multicarrier symbol in the second symbol set corresponds to second-type symbols in a first time unit format; each of the first-type symbols comprises (a) downlink symbol(s), while each of the second-type symbols comprises (an) uplink symbol(s); the second information is used for indicating a first spatial Rx parameter group associated with the first symbol set; the first time unit format is autonomously determined by a transmitter of the first information and the second information.

In one embodiment, the first communication device 410 comprises at least one processor and at least one memory, the at least one memory comprises computer program codes; the at least one memory and the computer program codes are configured to be used in collaboration with the at least one processor. The first communication device 410 at least transmits the first signaling in the present disclosure; the first signaling is used for indicating the first time unit format in the present disclosure; the first information is used for indicating a first symbol set and a second symbol set; the first symbol set and the second symbol set respectively comprise a positive integer number of multicarrier symbol(s); each multicarrier symbol in the first symbol set corresponds to first-type symbols in the first time unit format, while each multicarrier symbol in the second symbol set corresponds to second-type symbols in the first time unit format; each of the first-type symbols comprises (a) downlink symbol(s), while each of the second-type symbols comprises (an) uplink symbol(s); second information is used for indicating a first spatial Rx parameter group associated with the first symbol set; the first information and the second information are transmitted by a receiver of the first signaling.

In one embodiment, the first communication device 410 comprises a memory that stores computer readable instruction program, the computer readable instruction program generates an action when executed by at least one processor, which includes: transmitting the first signaling in the present disclosure; the first signaling is used for indicating the first time unit format in the present disclosure; the first information is used for indicating a first symbol set and a second symbol set; the first symbol set and the second symbol set respectively comprise a positive integer number of multicarrier symbol(s); each multicarrier symbol in the first symbol set corresponds to first-type symbols in the first time unit format, while each multicarrier symbol in the second symbol set corresponds to second-type symbols in the first time unit format; each of the first-type symbols comprises (a) downlink symbol(s), while each of the second-type symbols comprises (an) uplink symbol(s); second information is used for indicating a first spatial Rx parameter group associated with the first symbol set; the first information and the second information are transmitted by a receiver of the first signaling.

In one embodiment, at least one of the antenna 452, the receiver 454, the receiving processor 456, the multi-antenna receiving processor 458, the controller/processor 459, the memory 460 or the data source 467 is used for receiving the first signaling in the present disclosure; at least one of the antenna 420, the transmitter 418, the transmitting processor 416, the multi-antenna transmitting processor 471, the controller/processor 475 or the memory 476 is used for transmitting the first signaling in the present disclosure.

In one embodiment, at least one of the antenna 452, the receiver 454, the receiving processor 456, the multi-antenna receiving processor 458, the controller/processor 459, the memory 460 or the data source 467 is used for receiving the first information and the second information in the present disclosure; at least one of the antenna 420, the transmitter 418, the transmitting processor 416, the multi-antenna transmitting processor 471, the controller/processor 475 or the memory 476 is used for transmitting the first information and the second information in the present disclosure.

In one embodiment, at least one of the antenna 452, the receiver 454, the receiving processor 456, the multi-antenna receiving processor 458, the controller/processor 459, the memory 460 or the data source 467 is used for receiving the second signaling in the present disclosure; at least one of the antenna 420, the transmitter 418, the transmitting processor 416, the multi-antenna transmitting processor 471, the controller/processor 475 or the memory 476 is used for transmitting the second signaling in the present disclosure.

In one embodiment, at least one of the antenna 452, the receiver 454, the receiving processor 456, the multi-antenna receiving processor 458, the controller/processor 459, the memory 460 or the data source 467 is used for determining whether the second communication device 450 is in coverage.

In one embodiment, at least one of the antenna 452, the receiver 454, the receiving processor 456, the multi-antenna receiving processor 458, the controller/processor 459, the memory 460 or the data source 467 is used for receiving the Q first-type radio signal(s) in the present disclosure; at least one of the antenna 420, the transmitter 418, the transmitting processor 416, the multi-antenna transmitting processor 471, the controller/processor 475 or the memory 476 is used for transmitting the Q first-type radio signal(s) in the present disclosure.

In one embodiment, at least one of the antenna 452, the receiver 454, the receiving processor 456, the multi-antenna receiving processor 458, the controller/processor 459, the memory 460 or the data source 467 is used for receiving the target-specific signal in the present disclosure; at least one of the antenna 420, the transmitter 418, the transmitting processor 416, the multi-antenna transmitting processor 471, the controller/processor 475 or the memory 476 is used for transmitting the target-specific signal in the present disclosure.

In one embodiment, at least one of the antenna 452, the receiver 454, the receiving processor 456, the multi-antenna receiving processor 458, the controller/processor 459, the memory 460 or the data source 467 is used for receiving the second radio signal in the present disclosure; at least one of the antenna 420, the transmitter 418, the transmitting processor 416, the multi-antenna transmitting processor 471, the controller/processor 475 or the memory 476 is used for transmitting the second radio signal in the present disclosure.

Embodiment 5

Figure 5:
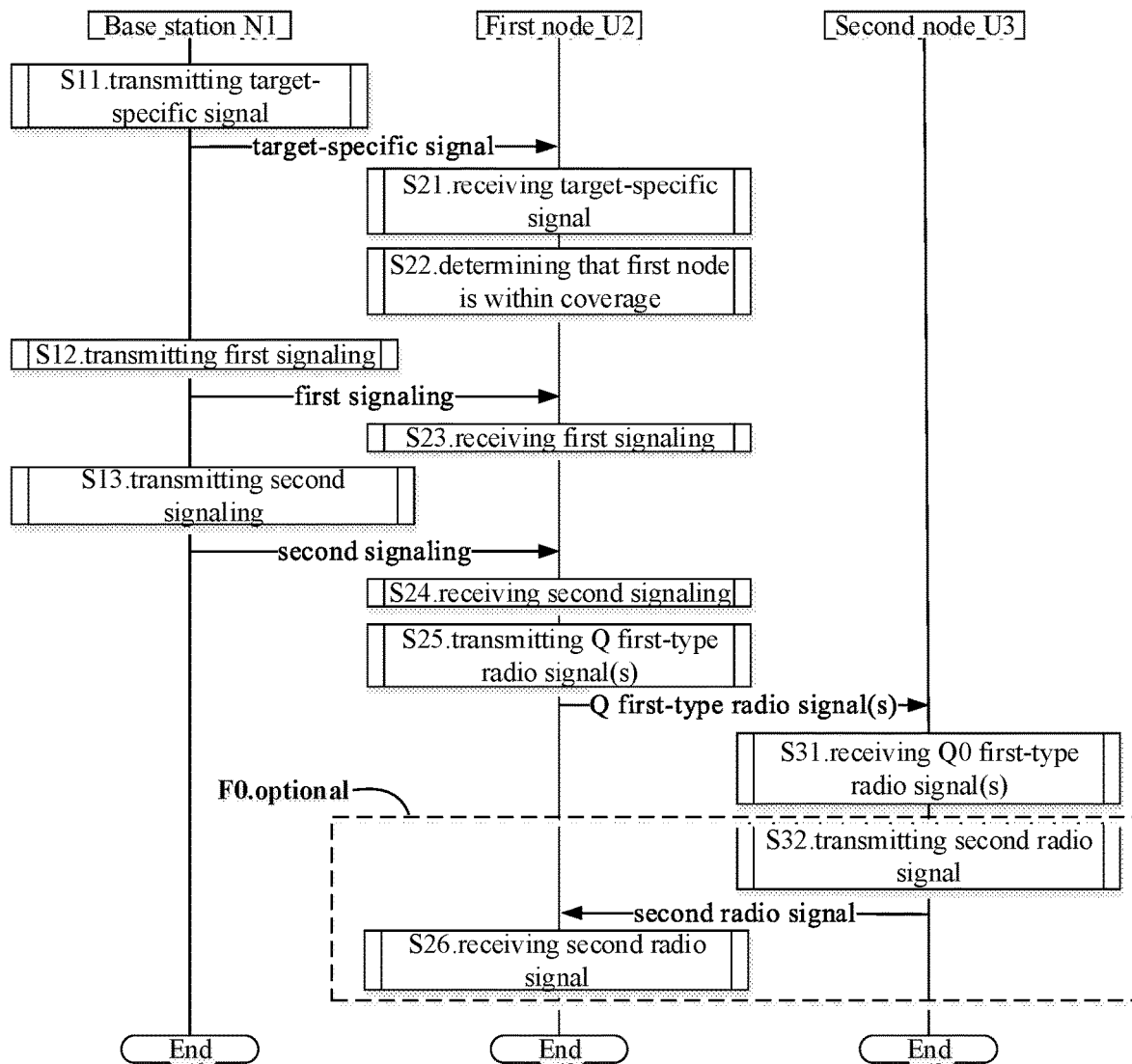
FIG. 5 illustrates a flowchart of a radio signal transmission according to one embodiment of the present disclosure.

Embodiment 5 illustrates a flowchart of a radio signal transmission according to one embodiment of the present disclosure, as shown in FIG. 5. In FIG. 5, a base station N1 is a maintenance base station for a serving cell of a first node U2, and a second node U3 is a communication node for the first node U2 that transmits via sidelink. Steps in dotted-line-framed box FO illustrated by FIG. 5 are optional.

The base station N1 transmits a target-specific signal in step S11; transmits a first signaling in step S12; and transmits a second signaling in step S13.

The first node U2 receives a target-specific signal in step S21; and determines that the first node U2 is in coverage in step S22; receives a first signaling in step S23; receives a second signaling in step S24; transmits Q first-type radio signal(s) in step S25; and receives a second radio signal in step S26.

The second node U3 receives Q0 first-type radio signal(s) of the Q first-type radio signal(s) in step S31; and transmits a second radio signal in step S32.

In Embodiment 5, the first node U2 determines whether the first node U2 is in coverage according to target received quality of the target-specific signal; when the first node U2 is in coverage, a first time unit format is indicated by the first signaling; when the first node U2 is in coverage, a first time unit set is indicated by the second signaling; each of the Q first-type radio signal(s) comprises first information and second information, or, the Q first-type radio signal(s) respectively comprises(comprise) Q piece(s) of first-type sub-information, first information being composed of the Q piece(s) of first-type sub-information, and second information being determined jointly by the Q first-type radio signal(s) and the Q piece(s) of first-type sub-information; the first information is used by the first node U2 for indicating a first symbol set and a second symbol set; the first symbol set and the second symbol set respectively comprise a positive integer number of multicarrier symbol(s); each multicarrier symbol in the first symbol set corresponds to first-type symbols in the first time unit format, while each multicarrier symbol in the second symbol set corresponds to second-type symbols in the first time unit format; each of the first-type symbols comprises (a) downlink symbol(s), while each of the second-type symbols comprises (an) uplink symbol(s); the second information is used by the first node U2 for indicating a first spatial Rx parameter group associated with the first symbol set; the first time unit set comprises a positive integer number of time unit(s); each time unit of the positive integer number of time unit(s) comprises a positive integer number of multicarrier symbol(s); the first symbol set is composed of multicarrier symbol(s) in the first time unit set corresponding to the first-type symbols in the first time unit format, while the second symbol set is composed of multicarrier symbol(s) in the first time unit set corresponding to the second-type symbols in the first time unit format; the Q is a positive integer, and the Q0 is a positive integer; the first information and the second information are used by the second node U3 for determining at least one of a time-domain resource or a spatial-domain resource occupied by the second radio signal.

In one embodiment, the first node U2 is a UE.

In one embodiment, the first node U2 is a relay node.

In one embodiment, the first node U2 comprises a Synchronization Reference User Equipment (SyncRefUE).

In one embodiment, the first node U2 comprises a SyncRefUE in coverage.

In one embodiment, the first node U2 comprises a SyncRefUE out of coverage.

In one embodiment, the second node U3 is a UE.

In one embodiment, the second node U3 is a relay node.

In one embodiment, the second node U3 comprises a SyncRefUE.

In one embodiment, the second node U2 comprises a SyncRefUE in coverage.

In one embodiment, the second node U2 comprises a SyncRefUE out of coverage.

In one embodiment, if each time unit in the first time unit set corresponds to the first time unit format, the first symbol set is composed of multicarrier symbol(s) in the first time unit set corresponding to the first-type symbols in the first time unit format.

In one embodiment, if each time unit in the first time unit set corresponds to the first time unit format, the second symbol set is composed of multicarrier symbol(s) in the first time unit set corresponding to the second-type symbols in the first time unit format.

In one embodiment, when the first node U2 receives the first signaling, the first node U2 receives the second signaling.

In one embodiment, the base station N1 comprises the GNSS.

In one embodiment, the base station N1 comprises a cell.

In one embodiment, the base station N1 comprises a serving Cell.

In one embodiment, the base station N1 comprises a Primary Cell (PCell).

In one embodiment, the base station N1 comprises a Secondary Cell (SCell).

In one embodiment, the base station N1 comprises a SyncRefUE.

In one embodiment, the base station N1 comprises a SyncRefUE in coverage.

In one embodiment, the base station N1 comprises a SyncRefUE out of coverage.

In one embodiment, the first information is used for indicating a time-domain resource occupied by the second radio signal.

In one embodiment, the time-domain resource comprises a positive integer number of multicarrier symbol(s).

In one embodiment, the time-domain resource belongs to the first symbol set.

In one embodiment, the time-domain resource belongs to the second symbol set.

In one embodiment, the second information is used for indicating a spatial-domain resource occupied by the second radio signal.

In one embodiment, the spatial-domain resource comprises a spatial Rx parameter group.

In one embodiment, the spatial-domain resource comprises a positive integer number of spatial Rx parameter(s).

In one embodiment, the spatial-domain resource comprises a positive integer number of antenna port(s).

In one embodiment, the spatial-domain resource belongs to a spatial Rx parameter group.

In one embodiment, at least one first-type radio signal of the Q first-type radio signal(s) is a Sidelink Synchronization Signal (SLSS).

In one embodiment, the Q first-type radio signal(s) is(are) transmitted on a Sidelink Broadcast Channel (SL-BCH).

In one embodiment, the Q first-type radio signal(s) is(are) transmitted on a Physical Sidelink Broadcast Channel (PSBCH).

In one embodiment, the Q first-type radio signal(s) is(are) transmitted on a Physical Sidelink Discovery Channel (PSDCH).

In one embodiment, the Q first-type radio signal(s) is(are) transmitted on a Physical Sidelink Control Channel (PSCCH).

In one embodiment, the Q first-type radio signal(s) is(are) transmitted on a Physical Sidelink Shared Channel (PSSCH).

In one embodiment, at least one first-type radio signal of the Q first-type radio signal(s) comprises a third data bit block, the third data bit block comprising a positive integer number of sequentially arranged bits.

In one embodiment, the third data bit block comprises one or more fields in a MIB.

In one embodiment, the third data bit block comprises one or more fields in a MIB-SL.

In one embodiment, the third data bit block comprises one or more fields in a SIB.

In one embodiment, the third data bit block comprises all or part of bits in a TB.

In one embodiment, the third data bit block comprises all or part of bits in a CB.

In one embodiment, one of the Q first-type radio signal(s) is obtained by all or part of bits in the third data bit block sequentially through TB-level Cyclic Redundancy Check (CRC) Attachment, Low-Density Parity-Check Code (LDPC) base graph selection, Code Block Segmentation, CB-level CRC Attachment, Channel Coding, Rate Matching, Code Block Concatenation, scrambling, Modulation, Layer Mapping, Antenna Port Mapping, Mapping to Virtual Resource Blocks, Mapping from Virtual to Physical Resource Blocks, Baseband Signal Generation, and Modulation and Upconversion.

In one embodiment, one of the Q first-type radio signal(s) is an output by all or part of bits in the third data bit block through at least one of TB-level Cyclic Redundancy Check (CRC) Attachment, Low-Density Parity-Check Code (LDPC) base graph selection, Code Block Segmentation, CB-level CRC Attachment, Channel Coding, Rate Matching, Code Block Concatenation, scrambling, Modulation, Layer Mapping, Antenna Port Mapping, Mapping to Virtual Resource Blocks, Mapping from Virtual to Physical Resource Blocks, Baseband Signal Generation, and Modulation and Upconversion.

In one embodiment, the third data bit block comprises the first information.

In one embodiment, the third data bit block comprises the second information.

In one embodiment, the third data bit block comprises the first information and the second information.

In one embodiment, the first information indicates the first symbol set and the second symbol set with a bitmap.

In one embodiment, the first information is used for indicating a first time-frequency resource group and a second time-frequency resource group, which are mutually orthogonal.

In one embodiment, the first time-frequency resource group comprises a positive integer number of first-type time-frequency resource(s), of which each first-type time-frequency resource comprises a positive integer number of Resource Element(s) (RE).

In one embodiment, the first time-frequency resource group comprises a positive integer number of first-type time-frequency resource(s), of which each first-type time-frequency resource comprises a positive integer number of multicarrier symbol(s).

In one embodiment, the second time-frequency resource group comprises a positive integer number of second-type time-frequency resource(s), of which each second-type time-frequency resource comprises a positive integer number of Resource Element(s) (RE).

In one embodiment, the second time-frequency resource group comprises a positive integer number of second-type time-frequency resource(s), of which each second-type time-frequency resource comprises a positive integer number of multicarrier symbol(s).

In one embodiment, the first symbol set is transmitted on the first time-frequency resource group.

In one embodiment, the second symbol set is transmitted on the second time-frequency resource group.

In one embodiment, the second information is used for indicating a first spatial Rx parameter group associated with the first time-frequency resource group.

In one embodiment, the second time-frequency resource group is associated with a second spatial Rx parameter group.

In one embodiment, the Q first-type radio signal(s) is(are) respectively transmitted on Q third-type time-frequency resource(s) of N third-type time-frequency resource(s), N being a positive integer no less than the Q.

In one embodiment, each of the N third-type time-frequency resource(s) comprises a positive integer number of multicarrier symbol(s).

In one embodiment, each of the N third-type time-frequency resource(s) comprises a positive integer number of RE(s).

Embodiment 6

Figure 6:
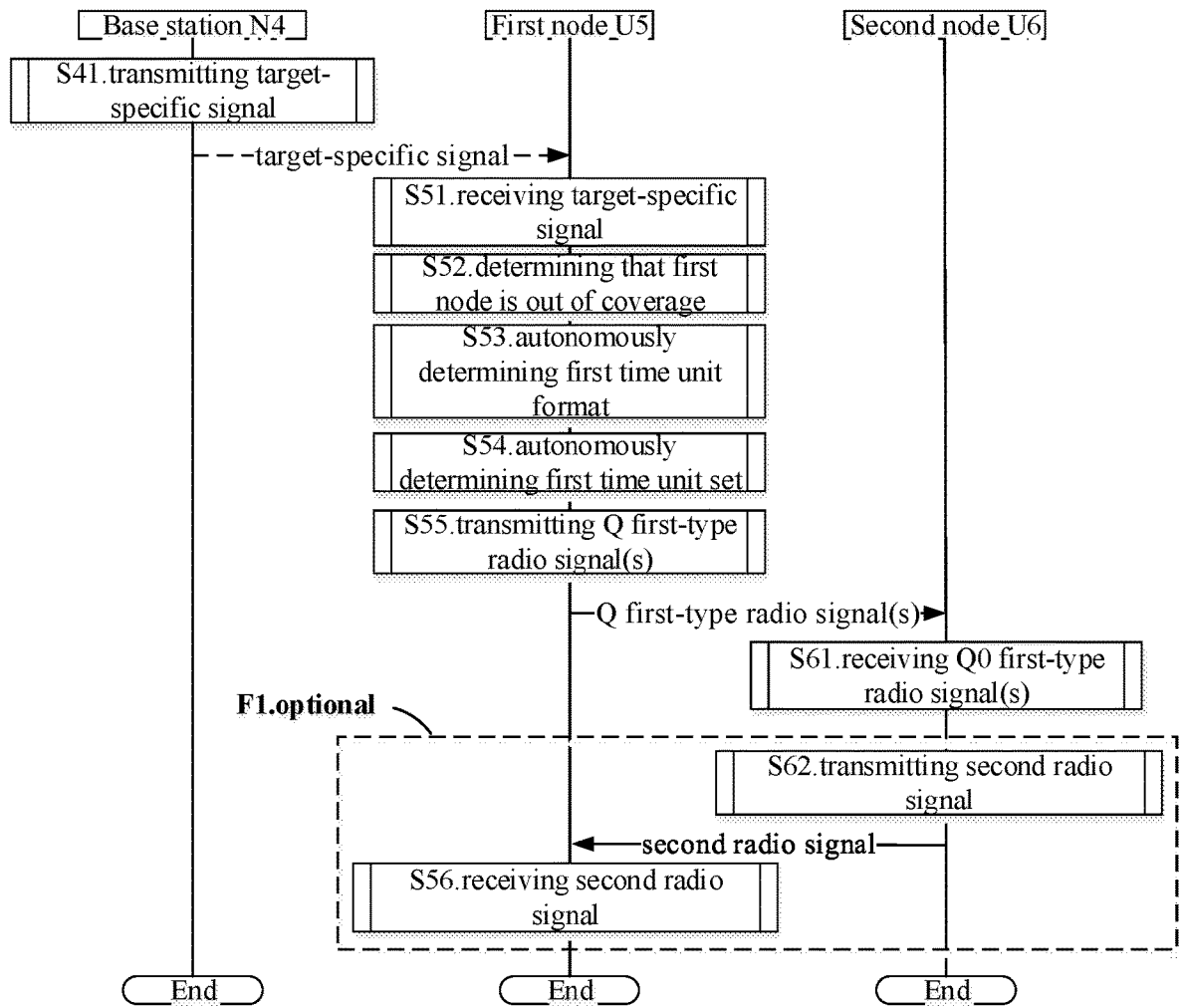
FIG. 6 illustrates a flowchart of a radio signal transmission according to another embodiment of the present disclosure.

Embodiment 6 illustrates a flowchart of a radio signal transmission according to another embodiment of the present disclosure, as shown in FIG. 6. In FIG. 6, a base station N4 is a maintenance base station for a serving cell of a first node U5, and a second node U6 is a communication node for the first node U5 that transmits via sidelink. Steps marked by dotted-line-framed box in FIG. 6 are optional.

The base station N4 transmits a target-specific signal in step S41.

The first node U5 receives a target-specific signal in step S51; and determines that the first node U5 is out of coverage in step S52; autonomously determines a first time unit format in step S53; and autonomously determines a first time unit set in step S54; transmits Q first-type radio signal(s) in step S55; and receives a second radio signal in step S56.

The second node U6 receives Q0 first-type radio signal(s) of Q first-type radio signal(s) in step S61; and transmits a second radio signal in step S62.

In Embodiment 6, the first node U5 determines whether the first node U5 is in coverage according to target received quality of the target-specific signal; when the first node U5 is out of coverage, the first node U5 autonomously determines a first time unit format; when the first node U5 is out of coverage, the first node U5 autonomously determines a first time unit set; each of the Q first-type radio signal(s) comprises first information and second information, or, the Q first-type radio signal(s) respectively comprises(comprise) Q piece(s) of first-type sub-information, first information being composed of the Q piece(s) of first-type sub-information, and second information being determined jointly by the Q first-type radio signal(s) and the Q piece(s) of first-type sub-information; the first information is used by the first node U5 for indicating a first symbol set and a second symbol set; the first symbol set and the second symbol set respectively comprise a positive integer number of multicarrier symbol(s); each multicarrier symbol in the first symbol set corresponds to first-type symbols in the first time unit format, while each multicarrier symbol in the second symbol set corresponds to second-type symbols in the first time unit format; each of the first-type symbols comprises (a) downlink symbol(s), while each of the second-type symbols comprises (an) uplink symbol(s); the second information is used by the first node U5 for indicating a first spatial Rx parameter group associated with the first symbol set; the first time unit set comprises a positive integer number of time unit(s); each time unit of the positive integer number of time unit(s) comprises a positive integer number of multicarrier symbol(s); the first symbol set is composed of multicarrier symbol(s) in the first time unit set corresponding to the first-type symbols in the first time unit format, while the second symbol set is composed of multicarrier symbol(s) in the first time unit set corresponding to the second-type symbols in the first time unit format; the Q is a positive integer, and the Q0 is a positive integer; the first information and the second information are used by the second node U6 for determining at least one of a time-domain resource or a spatial-domain resource occupied by the second radio signal.

In one embodiment, the first node U5 is a UE.
In one embodiment, the first node U5 is a relay node.
In one embodiment, the first node U5 comprises a SyncRefUE.
In one embodiment, the first node U5 comprises a SyncRefUE in coverage.
In one embodiment, the first node U5 comprises a SyncRefUE out of coverage.
In one embodiment, the second node U6 is a UE.
In one embodiment, the second node U6 is a relay node.
In one embodiment, the second node U6 comprises a SyncRefUE.
In one embodiment, the second node U6 comprises a SyncRefUE in coverage.
In one embodiment, the second node U6 comprises a SyncRefUE out of coverage.
In one embodiment, when the first node U5 autonomously determines a first time unit format, the first node U5 autonomously determines a first time unit set.
In one embodiment, the base station N4 comprises the GNSS.
In one embodiment, the base station N4 comprises a cell.
In one embodiment, the base station N4 comprises a serving Cell.
In one embodiment, the base station N4 comprises a Primary Cell (PCell).
In one embodiment, the base station N4 comprises a Secondary Cell (SCell).
In one embodiment, the base station N4 comprises a SyncRefUE.
In one embodiment, the base station N4 comprises a SyncRefUE in coverage.
In one embodiment, the base station N4 comprises a SyncRefUE out of coverage.
In one embodiment, the second radio signal is a Sidelink Synchronization Signal (SLSS).
In one embodiment, the second radio signal is transmitted on an SL-BCH.
In one embodiment, the second radio signal is transmitted on a PSBCH.
In one embodiment, the second radio signal is transmitted on a PSDCH.
In one embodiment, the second radio signal is transmitted on a PSCCH.
In one embodiment, the second radio signal is transmitted on a PSSCH.
In one embodiment, the second radio signal comprises a second data bit block, the second data bit block comprises a positive integer number of sequentially arranged bits.
In one embodiment, the second data bit block comprises one or more fields in a MIB.
In one embodiment, the second data bit block comprises one or more fields in a MIB-SL.
In one embodiment, the second data bit block comprises one or more fields in a SIB.
In one embodiment, the second data bit block comprises all or part of bits in a TB.
In one embodiment, the second data bit block comprises all or part of bits in a CB.
In one embodiment, the second radio signal is obtained by all or part of bits in the second data bit block sequentially through TB-level Cyclic Redundancy Check (CRC) Attachment, Low-Density Parity-Check Code (LDPC) base graph selection, Code Block Segmentation, CB-level CRC Attachment, Channel Coding, Rate Matching, Code Block Concatenation, scrambling, Modulation, Layer Mapping, Antenna Port Mapping, Mapping to Virtual Resource Blocks, Mapping from Virtual to Physical Resource Blocks, Baseband Signal Generation, and Modulation and Upconversion.

In one embodiment, the second radio signal is an output by all or part of bits in the second data bit block through at least one of TB-level Cyclic Redundancy Check (CRC) Attachment, Low-Density Parity-Check Code (LDPC) base graph selection, Code Block Segmentation, CB-level CRC Attachment, Channel Coding, Rate Matching, Code Block Concatenation, scrambling, Modulation, Layer Mapping, Antenna Port Mapping, Mapping to Virtual Resource Blocks, Mapping from Virtual to Physical Resource Blocks, Baseband Signal Generation, and Modulation and Upconversion.

In one embodiment, a time-domain resource of the second radio signal is determined according to the first information.

In one embodiment, multicarrier symbols occupied by a time-domain resource of the second radio signal belong to the first symbol set.

In one embodiment, multicarrier symbols occupied by a time-domain resource of the second radio signal comprise the first symbol set.

In one embodiment, multicarrier symbols occupied by a time-domain resource of the second radio signal belong to the second symbol set.

In one embodiment, a spatial-domain resource of the second radio signal is determined according to the second information.

In one embodiment, a spatial-domain resource of the second radio signal belongs to the first spatial Rx parameter group.

In one embodiment, a spatial-domain resource of the second radio signal comprises the first spatial Rx parameter group.

In one embodiment, a first time-domain resource is a time-domain resource for the first symbol set.

In one embodiment, a spatial-domain resource occupied by a radio signal transmitted on the first time-domain resource belongs to the first spatial Rx parameter group.

In one embodiment, a spatial-domain resource occupied by a radio signal transmitted on the first time-domain resource comprises the first spatial Rx parameter group.

In one embodiment, a spatial-domain resource occupied by a radio signal transmitted on the first time-domain resource belongs to an antenna port corresponding to the first spatial Rx parameter group.

In one embodiment, a spatial-domain resource occupied by a radio signal transmitted on the first time-domain resource comprises an antenna port corresponding to the first spatial Rx parameter group.

Embodiment 7

Figure 7:
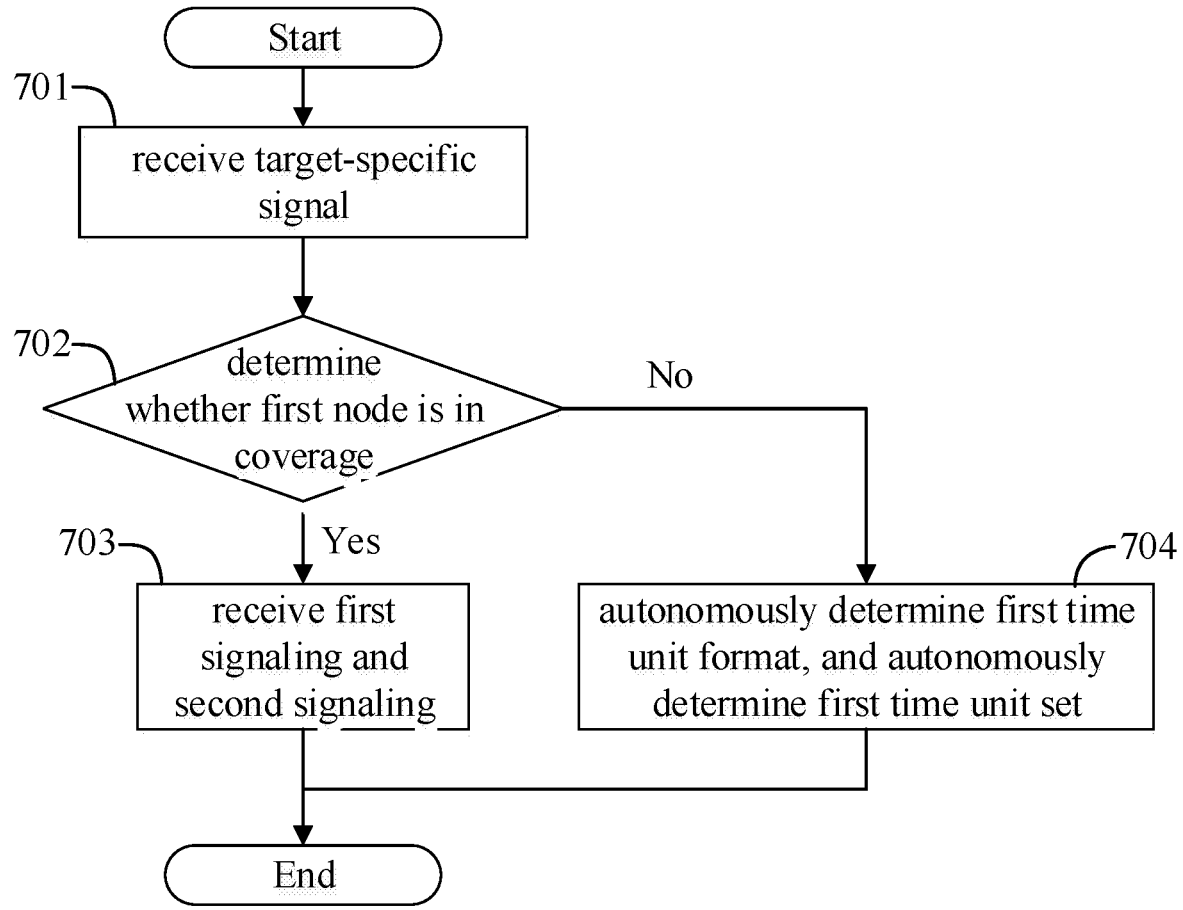
FIG. 7 illustrates a flowchart of determining a first time unit format and a first time unit set according to one embodiment of the present disclosure.

Embodiment 7 illustrates a flowchart of determining a first time unit format and a first time unit set according to one embodiment of the present disclosure, as shown in FIG. 7.

In Embodiment 7, the first node in the present disclosure receives a target-specific signal, and determines whether the first node is in coverage according to the target received quality of the target-specific signal; when the first node is in coverage, the first node receives a first signaling and a second signaling, the first signaling being used for indicating a first time unit format, while the second signaling being used for indicating a first time unit set; when the first node is out of coverage, the first node autonomously determines the first time unit format and the first time unit set.

In one embodiment, when the first node is in coverage, the second signaling is used for indicating the first time unit set.

In one embodiment, the second signaling is dynamically configured.

In one embodiment, the second signaling is semi-statically configured.

In one embodiment, the second signaling comprises all or part of a higher-layer signaling.

In one embodiment, the second signaling comprises all or part of an RRC layer signaling.

In one embodiment, the second signaling comprises one or more fields in an RRC IE.

In one embodiment, the second signaling comprises all or part of a MAC layer signaling.

In one embodiment, the second signaling comprises one or more fields in a MAC CE.

In one embodiment, the second signaling comprises one or more fields in a PHY layer.

In one embodiment, the second signaling comprises one or more fields in a piece of DCI.

In one embodiment, the second signaling is transmitted on a Physical Broadcast Channel (PBCH).

In one embodiment, the second signaling comprises a second control bit block, the second control bit block comprises a positive integer number of sequentially arranged bits.

In one embodiment, the second control bit block comprises one or more fields in a MIB.

In one embodiment, the second control bit block comprises one or more fields in a MIB-SL.

In one embodiment, the second control bit block comprises one or more fields in a SIB.

In one embodiment, the second signaling is obtained by all or part of bits in the second control bit block sequentially through first-class scrambling, transport-block-level (TB-level) Cyclic Redundancy Check (CRC) Attachment, Channel Coding, Rate Matching, second-class scrambling, Modulation and Layer Mapping, Transform Precoding and Precoding, Mapping to Physical Resources, and Baseband Signal Generation, Modulation and Upconversion.

In one embodiment, the second signaling is an output by all or part of bits in the second control bit block through at least one of Segmentation Channel Coding, Rate Matching, Concatenation, scrambling, modulation, layer mapping, Spreading Transform Precoding, Precoding, Mapping to Physical Resources, Baseband Signal Generation, or Modulation and Upconversion.

In one embodiment, the second control bit block comprises the first time unit set.

In one embodiment, the first time unit set indicates by a bitmap.

In one embodiment, the first time unit set is used for generating a scrambling sequence of the first control bit block.

In one embodiment, the second signaling is transmitted through a PDCCH identified by SI-RNTI.

In one embodiment, the second signaling is transmitted through a PDCCH identified by C-RNTI.

In one embodiment, the second signaling is transmitted through a PDCCH scrambled by SI-RNTI based on Cyclic Redundancy Check (CRC).

In one embodiment, the second signaling is transmitted through a PDCCH scrambled by scrambled by C-RNTI based on Cyclic Redundancy Check (CRC)

In one embodiment, a transmitter of the second signaling is a Synchronization Reference Source for the first node.

In one embodiment, the Synchronization Reference Source's timing is used for receiving of the target-specific signal.

In one embodiment, the Synchronization Reference Source's timing is used for receiving of the second signaling.

In one embodiment, the Synchronization Reference Source's timing is used for transmission of the Q first-type radio signal(s).

In one embodiment, when the first node is out of coverage, the first time unit format is configured by first pre-configuration information.

In one embodiment, when the first node is out of coverage, the first time unit set is configured by first pre-configuration information.

In one embodiment, a transmitter of the first pre-configuration information is not the Synchronization Reference Source for the first node.

In one embodiment, the first pre-configuration information comprises one or more fields in SL-Preconfiguration Information Element (IE) in 3GPP TS38.331.

In one embodiment, the first pre-configuration information comprises one or more fields in SL-V2X-Preconfiguration IE in 3GPP TS38.331.

In one embodiment, the first pre-configuration information comprises a sidelink resource pool, the sidelink resource pool being used for sidelink communication.

In one embodiment, when the first node is out of coverage, the first time unit format is pre-defined, that is, there is no need for signaling configuration.

In one embodiment, when the first node is out of coverage, the first time unit set is pre-defined, that is, there is no need for signaling configuration.

Embodiment 8

Figure 8:
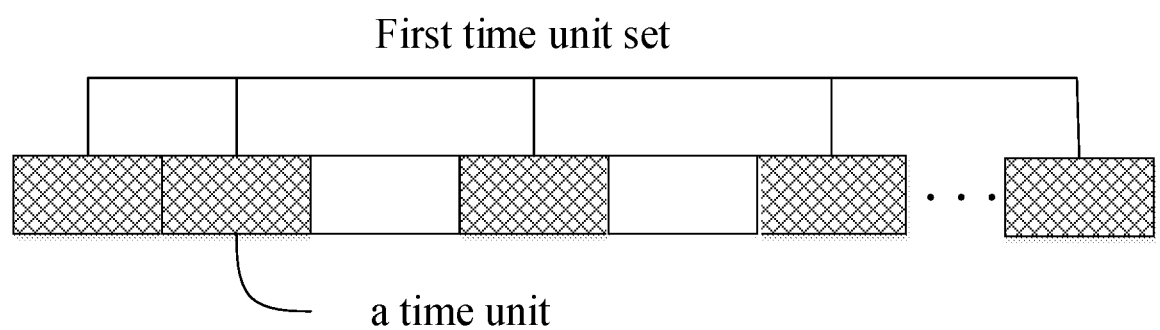
FIG. 8 illustrates a schematic diagram of relationship between a first time unit set and time units according to one embodiment of the present disclosure.

Embodiment 8 illustrates a schematic diagram of relationship between a first time unit set and time units according to one embodiment of the present disclosure, as shown in FIG. 8. In FIG. 8, each box filled with cross lines represents a time unit, and all cross-filled boxes constitute a first time unit set.

In Embodiment 8, a first time unit set in the present disclosure comprises a positive integer number of time units.

In one embodiment, the time unit comprises a positive integer number of Frame(s) in time domain.

In one embodiment, the time unit belongs to a Frame in time domain.

In one embodiment, the time unit is equivalent to a Frame in time domain.

In one embodiment, the time unit comprises a positive integer number of Half-Frame(s) in time domain.

In one embodiment, the time unit belongs to a Half-Frame in time domain.

In one embodiment, the time unit is equivalent to a Half-Frame in time domain.

In one embodiment, the time unit comprises a positive integer number of Subframe(s) in time domain.

In one embodiment, the time unit belongs to a Subframe in time domain.

In one embodiment, the time unit is equivalent to a Subframe in time domain.

In one embodiment, the time unit comprises a positive integer number of Half-Subframe(s) in time domain.

In one embodiment, the time unit belongs to a Half-Subframe in time domain.

In one embodiment, the time unit is equivalent to a Half-Subframe in time domain.

In one embodiment, the time unit comprises a positive integer number of Slot(s) in time domain.

In one embodiment, the time unit belongs to a Slot in time domain.

In one embodiment, the time unit is equivalent to a Slot in time domain.

In one embodiment, the time unit comprises a positive integer number of Mini-slot(s) in time domain.

In one embodiment, the time unit belongs to a Mini-slot in time domain.

In one embodiment, the time unit is equivalent to a Mini-slot in time domain.

In one embodiment, the time unit is equal to 10 ms.

In one embodiment, the time unit is equal to 5 ms.

In one embodiment, the time unit is equal to 1 ms.

In one embodiment, the time unit comprises a positive integer number of multicarrier symbol(s) in time domain.

In one embodiment, the time unit comprises 14 multicarrier symbols in time domain.

In one embodiment, the time unit belong to a multicarrier symbol in time domain.

In one embodiment, the time unit is equivalent to a multicarrier symbol in time domain.

In one embodiment, the time unit comprises a downlink multicarrier symbol in time domain.

In one embodiment, the time unit comprises an uplink multicarrier symbol in time domain.

In one embodiment, the time unit comprises a Flexible multicarrier symbol in time domain.

In one embodiment, the time unit is used for sidelink communication.

In one embodiment, the time unit is used for downlink transmission.

In one embodiment, the time unit is used for uplink transmission.

In one embodiment, the time unit belong to a PSBCH.

In one embodiment, the time unit belong to a PSCCH.

In one embodiment, the time unit belong to a PSDCH.

In one embodiment, the time unit belong to a PSSCH.

In one embodiment, the time unit belong to a Primary Sidelink Synchronization Signal (PSSS).

In one embodiment, the time unit belong to a Secondary Sidelink Synchronization Signal (SSSS).

In one embodiment, the time unit belong to a PBCH.

In one embodiment, the time unit belong to a PDCCH.

In one embodiment, the time unit belong to a PDSCH.

In one embodiment, the time unit belong to a PUCCH.

In one embodiment, the time unit belong to a PUSCH.

In one embodiment, the time unit belong to a PRACH.

In one embodiment, the time unit belong to a Short Physical Downlink Control Channel (SPDCCH).

In one embodiment, the time unit belong to a Short Physical Uplink Control Channel (SPUCCH).

In one embodiment, the time unit belong to a Narrowband Physical Broadcast Channel (NPBCH).

In one embodiment, the time unit belong to a Narrowband Physical Control Channel (NPDCCH).

In one embodiment, the time unit belong to a Narrowband Physical Downlink Shared Channel (NPDSCH).

In one embodiment, the time unit belong to a Narrowband Physical Random Access Channel (NPRACH).

In one embodiment, the time unit belong to a Narrowband Physical Uplink Shared Channel (NPUSCH).

In one embodiment, the first time unit does not comprise REs allocated to a Reference Signal (RS).

In one embodiment, the first time unit comprises REs allocated to a Guard Period (GP).

In one embodiment, the positive integer number of the time units comprised in the first time unit set are non-consecutive in time.

In one embodiment, at least two adjacent time units comprised in the first time unit set are non-consecutive in time.

In one embodiment, there is at least one time unit existing between at least two adjacent time units comprised in the first time unit set does not belong to the first time unit set.

Embodiment 9

Figure 9:
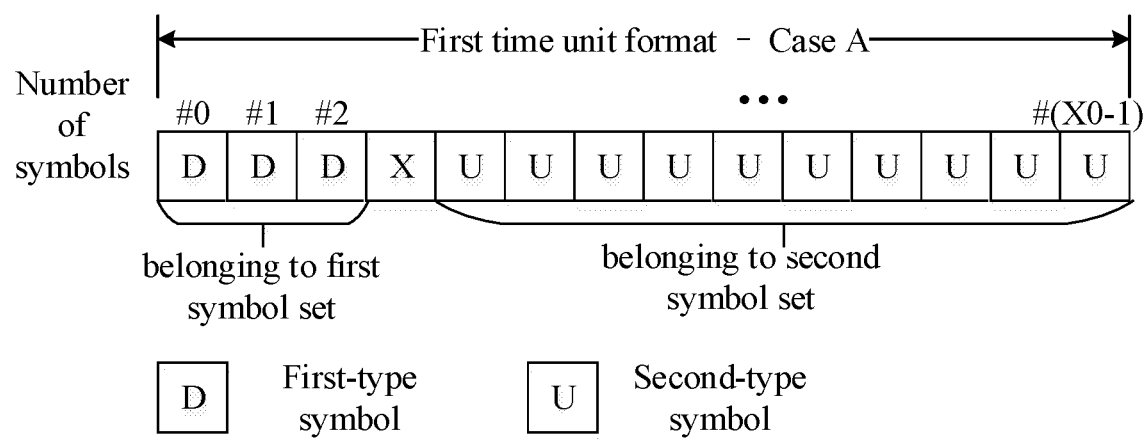
FIG. 9 illustrates a schematic diagram of Case A of a first time unit format according to one embodiment of the present disclosure.

Embodiment 9 illustrates a schematic diagram of Case A of a first time unit format according to one embodiment of the present disclosure, as shown in FIG. 9. In FIG. 9, each box marked with D represents a first-type symbol, and each box marked with U represents a second-type symbol.

In Embodiment 9, as illustrated in the first time unit format in the present disclosure, X0 consecutive multicarrier symbols are arranged in an ascending order in time domain, respectively marked with sequence numbers from Symbol #0, Symbol #1, Symbol #2 . . . , to Symbol #(X0−1), X0 being a positive integer; the first time unit format comprises that X1 multicarrier symbol(s) is(are) first-type symbol(s), and that X2 multicarrier symbol(s) is(are) second-type symbol(s), both X1 and X2 being positive integers.

In one embodiment, any multicarrier symbol in the first time unit format is the first-type symbol.

In one embodiment, any multicarrier symbol in the first time unit format is a downlink symbol.

In one embodiment, the X1 is equal to 14, and the X2 is equal to 0.

In one embodiment, any multicarrier symbol in the first time unit format is the second-type symbol.

In one embodiment, any multicarrier symbol in the first time unit format is an uplink symbol.

In one embodiment, the X1 is equal to 0, and the X2 is equal to 14.

In one embodiment, the first-type symbol comprises a Flexible symbol.

In one embodiment, the second-type symbol comprises a Flexible symbol.

In one embodiment, the first-type symbol comprises a downlink symbol and a Flexible symbol.

In one embodiment, the second-type symbol comprises an uplink symbol and a Flexible symbol.

In one embodiment, the first time unit format comprises Y1 downlink symbol(s), Y2 uplink symbol(s) and Y3 Flexible symbol(s), Y1, Y2 and Y3 being positive integers.

In one embodiment, any multicarrier symbol in the first time unit format is a Flexible symbol.

In one embodiment, the Y1 is 0, the Y2 is 0 and the Y3 is 14.

In one embodiment, the detailed definition of the first time unit format can be found in 3GPP TS38.211, section 4.3.2.

In one embodiment, at least one time unit in the first time unit set corresponds to the first time unit format.

In one embodiment, the time unit belongs to a Downlink frame.

In one embodiment, the time unit belongs to an Uplink frame.

In one embodiment, the first time unit set comprises a positive integer number of Downlink frame(s) and a positive integer number of Uplink frame(s).

In one embodiment, the time unit belongs to a Downlink subframe.

In one embodiment, the time unit belongs to an Uplink subframe.

In one embodiment, the first time unit set comprises a positive integer number of Downlink subframe(s) and a positive integer number of Uplink subframe(s).

In one embodiment, the time unit belongs to a Downlink slot.

In one embodiment, the time unit belongs to an Uplink slot.

In one embodiment, the first time unit set comprises a positive integer number of Downlink slot(s) and a positive integer number of Uplink slot(s).

In one embodiment, a first time unit is one of the positive integer number of the time unit(s) comprised in the first time unit set that belongs to a Downlink frame.

In one embodiment, a first time unit is one of the positive integer number of the time unit(s) comprised in the first time unit set that belongs to a Downlink subframe.

In one embodiment, a first time unit is one of the positive integer number of the time unit(s) comprised in the first time unit set that belongs to a Downlink slot.

In one embodiment, a second time unit is one of the positive integer number of the time unit(s) comprised in the first time unit set that belongs to an Uplink frame.

In one embodiment, a second time unit is one of the positive integer number of the time unit(s) comprised in the first time unit set that belongs to an Uplink subframe.

In one embodiment, a second time unit is one of the positive integer number of the time unit(s) comprised in the first time unit set that belongs to an Uplink slot.

In one embodiment, each multicarrier symbol in the first time unit corresponding to the first-type symbols in the first time unit format is used for downlink transmission.

In one embodiment, each multicarrier symbol in the first time unit corresponding to the second-type symbols in the first time unit format is used for sidelink communication.

In one embodiment, each multicarrier symbol in the second time unit corresponding to the second-type symbols in the first time unit format is used for uplink transmission.

In one embodiment, each multicarrier symbol in the second time unit corresponding to the second-type symbols in the first time unit format is used for sidelink communication.

In one embodiment, a first symbol set comprises multicarrier symbol(s) in the first time unit set that corresponds (correspond) to the first-type symbols in the first time unit format.

In one embodiment, each multicarrier symbol in the first time unit corresponding to first-type symbols in the first time unit format belongs to the first symbol set.

In one embodiment, each multicarrier symbol in the first time unit corresponding to second-type symbols in the first time unit format belongs to the first symbol set.

In one embodiment, each multicarrier symbol in the second time unit corresponding to first-type symbols in the first time unit format belongs to the first symbol set.

In one embodiment, multicarrier symbol(s) in the first time unit set that corresponds(correspond) to the first-type symbols in the first time unit format belongs(belong) to the first symbol set.

In one embodiment, a second symbol set comprises multicarrier symbol(s) in the first time unit set that corresponds(correspond) to the second-type symbols in the first time unit format.

In one embodiment, each multicarrier symbol in the second time unit corresponding to second-type symbols in the first time unit format belongs to the second symbol set.

In one embodiment, each multicarrier symbol in the second time unit corresponding to first-type symbols in the first time unit format belongs to the second symbol set.

In one embodiment, each multicarrier symbol in the first time unit corresponding to second-type symbols in the first time unit format belongs to the second symbol set.

In one embodiment, multicarrier symbol(s) in the first time unit set that corresponds(correspond) to the second-type symbols in the first time unit format belongs(belong) to the second symbol set.

In one embodiment, the second symbol set does not comprise any multicarrier symbol in the first symbol set.

Embodiment 10

Figure 10:
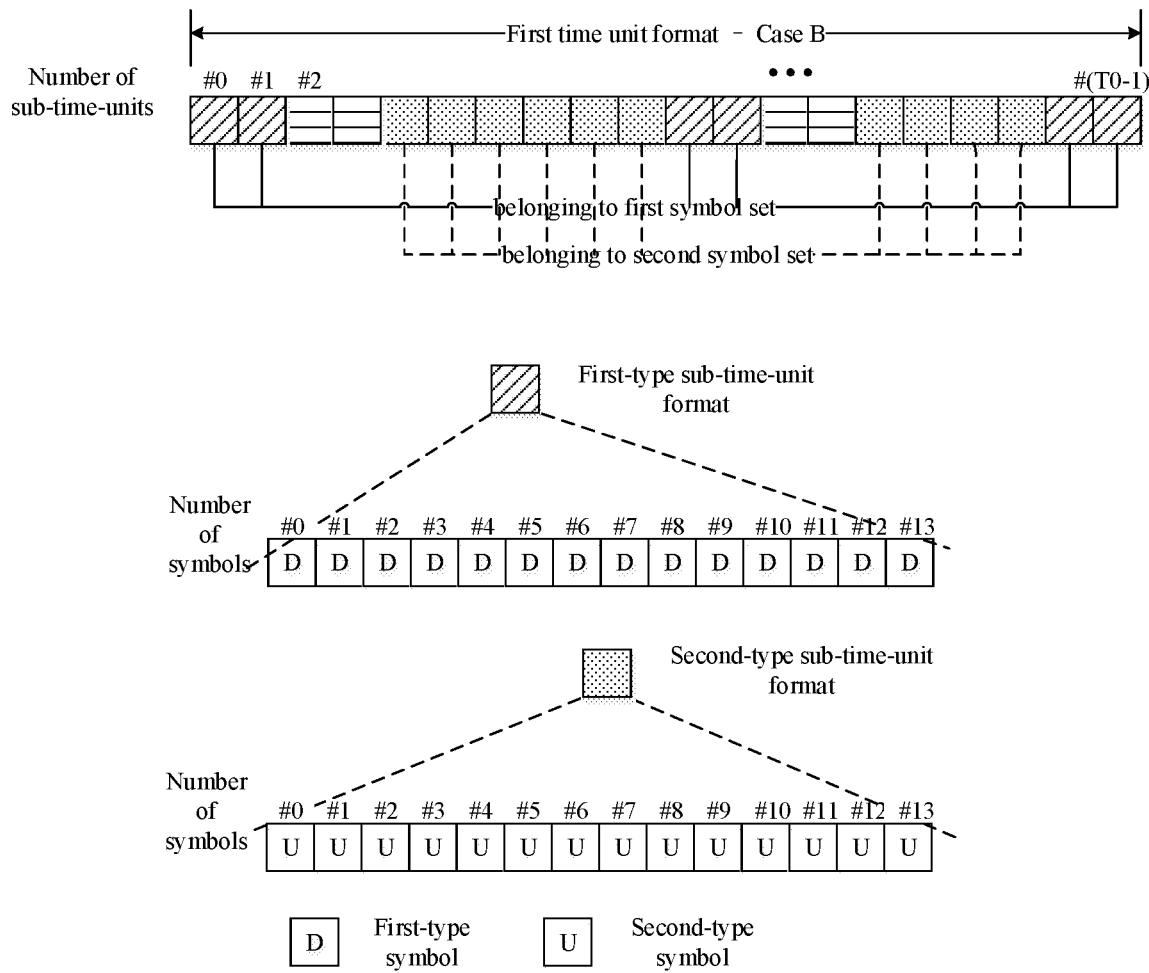
FIG. 10 illustrates a schematic diagram of Case B of a first time unit format according to one embodiment of the present disclosure.

Embodiment 10 illustrates a schematic diagram of Case B of a first time unit format according to one embodiment of the present disclosure, as shown in FIG. 10. In FIG. 10, slash-filled box(es) represents(represent) a first-type sub-time-unit, while dot-filled box(es) represents(represent) a second-type sub-time-unit; each box marked with D represents a first-type symbol, while each box marked with U represents a second-type symbol.

In Embodiment 10, a first time unit format comprises T0 consecutive sub-time-units, each of which comprising a positive integer number of multicarrier symbol(s); in the first time unit format, the T0 consecutive sub-time-units are arranged in an ascending order in time domain, respectively marked with sequence numbers of sub-time-unit #0, sub-time-unit #1 . . . , and sub-time-unit #(T0−1), T0 being a positive integer; the first time unit format comprises that T1 sub-time-unit(s) is(are) first-type sub-time-unit format(s), and that T2 sub-time-unit(s) is(are) second-type sub-time-unit format(s), T1 and T2 both being positive integers.

In one embodiment, the sub-time-unit belongs to a Frame.

In one embodiment, the sub-time-unit belongs to a Half-frame.

In one embodiment, the sub-time-unit belongs to a Sub-frame.

In one embodiment, the sub-time-unit is equivalent to a Subframe.

In one embodiment, the sub-time-unit belongs to a Half-subframe.

In one embodiment, the sub-time-unit belongs to a slot.

In one embodiment, the sub-time-unit belongs to a mini-slot.

In one embodiment, the sub-time-unit is equivalent to 20 slots.

In one embodiment, the sub-time-unit comprises a positive integer number of multicarrier symbol(s).

In one embodiment, the sub-time-unit belongs to a positive integer number of multicarrier symbol(s).

In one embodiment, the sub-time-unit is composed of a positive integer number of multicarrier symbol(s).

In one embodiment, the first-type sub-time-unit format comprises a positive integer number of multicarrier symbol(s), and each of the positive integer number of multicarrier symbol(s) is the first-type symbol.

In one embodiment, the second-type sub-time-unit format comprises a positive integer number of multicarrier symbol(s), and each of the positive integer number of multicarrier symbol(s) is the second-type symbol.

In one embodiment, any sub-time-unit in the first time unit format is the first-type sub-time-unit format.

In one embodiment, any sub-time-unit in the first time unit format is a Downlink frame.

In one embodiment, any sub-time-unit in the first time unit format is a Downlink subframe.

In one embodiment, any sub-time-unit in the first time unit format is a Downlink slot.

In one embodiment, the T1 is equal to 20, and the T2 is equal to 0.

In one embodiment, any sub-time-unit in the first time unit format is the second-type sub-time-unit format.

In one embodiment, any sub-time-unit in the first time unit format is an Uplink frame.

In one embodiment, any sub-time-unit in the first time unit format is an Uplink subframe.

In one embodiment, any sub-time-unit in the first time unit format is an Uplink slot.

In one embodiment, at least one time unit in the first time unit set corresponds to the first time unit format.

In one embodiment, the T1 is equal to 0, and the T2 is equal to 20.

In one embodiment, multicarrier symbol(s) in at least one time unit comprised by the first time unit set that corresponds(correspond) to the first-type sub-time-unit format of the first time unit format is(are) used for downlink transmission.

In one embodiment, multicarrier symbol(s) in at least one time unit comprised by the first time unit set that corresponds(correspond) to the second-type sub-time-unit format of the first time unit format is(are) used for sidelink communication.

In one embodiment, multicarrier symbol(s) in at least one time unit comprised by the first time unit set that corresponds(correspond) to the second-type sub-time-unit format of the first time unit format is(are) used for uplink transmission.

In one embodiment, multicarrier symbol(s) in at least one time unit comprised by the first time unit set that corresponds(correspond) to the first-type sub-time-unit format of the first time unit format is(are) used for sidelink communication.

In one embodiment, a first symbol set comprises multicarrier symbol(s) comprised by (all) the time unit(s) in the first time unit set that corresponds(correspond) to the first-type sub-time-unit format of the first time unit format.

In one embodiment, a second symbol set comprises multicarrier symbol(s) comprised by (all) the time unit(s) in the first time unit set that corresponds(correspond) to the first-type sub-time-unit format of the first time unit format.

Embodiment 11

Figure 11:
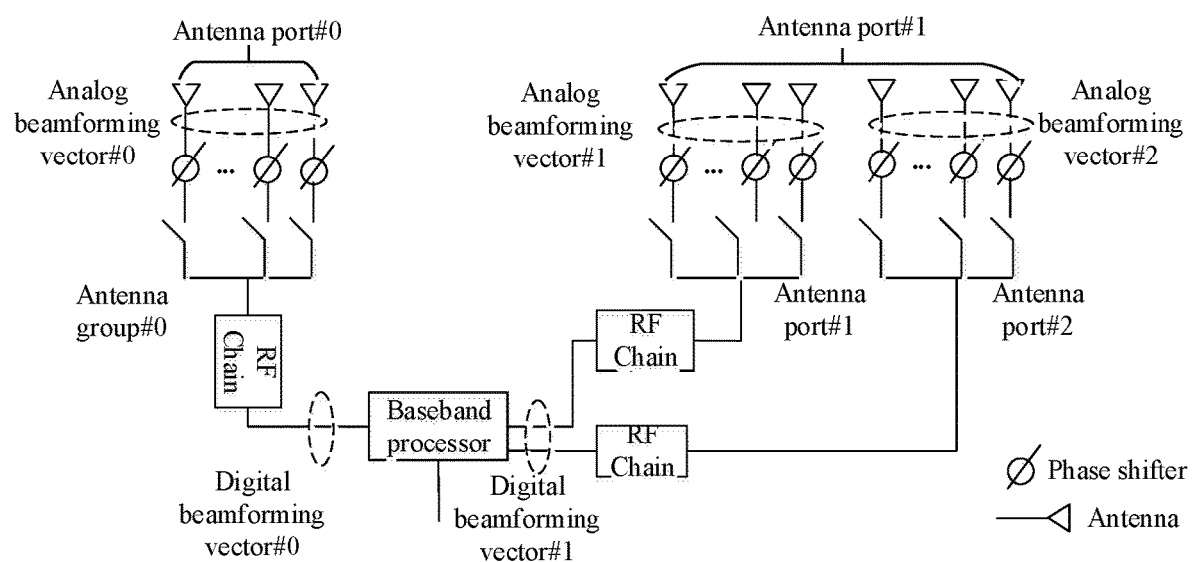
FIG. 11 illustrates a schematic diagram of relationship between antenna port(s) and an antenna port group according to one embodiment of the present disclosure.

Embodiment 11 illustrates a schematic diagram of relationship between antenna port(s) and an antenna port group according to one embodiment of the present disclosure, as shown in FIG. 11.

In Embodiment 11, an antenna port group comprises a positive integer number of antenna port(s); an antenna port is formed by superimposing antennas in a positive integer number of antenna group(s) through antenna virtualization; an antenna group comprises a positive integer number of antenna(s). An antenna group is connected to a baseband processor via a Radio Frequency (RF) chain, so different antenna groups correspond to different RF chains. A given antenna port is an antenna port in the antenna port group, mapping coefficients of all antennas in a positive integer number of antenna group(s) comprised by the given antenna port to the given antenna port constitute a beamforming vector corresponding to the given antenna port. Mapping coefficients of multiple antennas in any given antenna group of a positive integer number of antenna group(s) comprised by the given antenna port to the given antenna port constitute an analog beamforming vector of the given antenna group. Analog beamforming vector(s) respectively corresponding to the positive integer number of antenna group(s) comprised by the given antenna port is(are) diagonally arranged to form an analog beamforming matrix corresponding to the given antenna port. Mapping coefficient(s) of the positive integer number of antenna group(s) comprised by the given antenna port to the given antenna port constitutes(constitute) a digital beamforming vector corresponding to the given antenna port. A beamforming vector corresponding to the given antenna port is a product of an analog beamforming matrix corresponding to the given antenna port and a digital beamforming vector corresponding to the given antenna port.

Two antenna port groups are presented in FIG. 11, which are antenna port group #0 and antenna port group #1. Herein, the antenna port group #0 is composed of antenna group #0, while the antenna port group #1 is composed of antenna group #1 and antenna group #2. Mapping coefficients of multiple antennas in the antenna group #0 to the antenna port group #0 constitute an analog beamforming vector #0, while a mapping coefficient of the antenna group #0 to the antenna port group #0 constitutes a digital beamforming vector #0. A beamforming vector corresponding to the antenna port #0 is a product of the analog beamforming vector #0 and the digital beamforming vector #0. Mapping coefficients of multiple antennas in the antenna group #1 and of multiple antennas in the antenna group #2 to the antenna port group #1 respectively constitute an analog beamforming vector #1 and an analog beamforming vector #2; and mapping coefficients of the antenna group #1 and of the antenna group #2 to the antenna port group #1 constitute a digital beamforming vector #1. A beamforming vector corresponding to the antenna port #1 is a product of the digital beamforming vector #1 and an analog beamforming matrix formed by diagonally arranging of the analog beamforming vector #1 and the analog beamforming vector #2.

In one embodiment, an antenna port group comprises only one antenna port, i.e., an RF chain, for instance, the antenna port group #0 as illustrated in FIG. 11.

In one subembodiment, an analog beamforming matrix corresponding to the antenna port is dimensionally reduced to an analog beamforming vector, and a digital beamforming vector corresponding to the antenna port is dimensionally reduced to a scaler, and a beamforming vector corresponding to the antenna port is equivalent to an analog beamforming vector corresponding to the antenna port. For example, the antenna port #0 in FIG. 11 only comprises the antenna group #0, the digital beamforming vector #0 in FIG. 11 is dimensionally reduced to a scaler, and a beamforming vector corresponding to the antenna port #0 is the analog beamforming vector #0.

In one embodiment, an antenna port group comprises a positive integer number of antenna group(s), i.e., a positive integer number of RF chain(s), for example, the antenna port group #1 as illustrated in FIG. 11.

In one embodiment, the detailed definition of the antenna port can be found in 3GPP TS36.211, section 5.2 and section 6.2, or in 3GPP TS38.211, section 4.4.

In one embodiment, small-scale channel parameters that a radio signal transmitted on one antenna port goes through can be used to infer small-scale channel parameters that another radio signal transmitted on the antenna port goes through.

In one subembodiment, the small-scale channel parameters include one or more of a Channel Impulse Response (CIR), a Precoding Matrix Indicator (PMI), a Channel Quality Indicator (CQI) or a Rank Indicator (RI).

In one embodiment, two antenna ports being Quasi Co-Located (QCL) means that all or part of large-scale properties of a radio signal transmitted on one of the two antenna ports can be used to infer all or part of large-scale properties of a radio signal transmitted on the other of the two antenna ports.

In one embodiment, large-scale properties of a radio signal comprise one or more of delay spread, Doppler spread, Doppler shift, average gain, average delay or Spatial Rx parameters.

In one embodiment, the detailed definition of the QCL can be found in section 6.2 of 3GPP TS36.211, section 4.4 of 3GPP TS38.211, or section 5.1.5 of 3GPP TS38.214.

In one embodiment, the phrase that a QCL type between one antenna port and another is QCL-TypeD means that Spatial Rx parameters of a radio signal transmitted on one antenna port can be used to infer Spatial Rx parameters of a radio signal transmitted on another antenna port.

In one embodiment, the phrase that a QCL type between one antenna port and another is QCL-TypeD means that a radio signal transmitted on one antenna port and a radio signal transmitted on another antenna port can be received with the same Spatial Rx parameters.

In one embodiment, the detailed definition of the QCL-TypeD can be found in 3GPP TS38.214, section 5.1.5.

In one embodiment, the Spatial Rx parameters comprise one or more of a reception beam, a reception analog beamforming matrix, a reception analog beamforming vector, a reception digital beamforming vector, a reception beamforming vector or a Spatial Domain Receive Filter.

In one embodiment, a first spatial Rx parameter group comprises a positive integer number of spatial Rx parameter(s).

In one embodiment, the first spatial Rx parameter group corresponds to a positive integer number of antenna port group(s).

In one embodiment, each spatial Rx parameter in the first spatial Rx parameter group corresponds to an antenna port group.

In one embodiment, the first spatial Rx parameter group corresponds to an antenna port group.

In one embodiment, the first spatial Rx parameter group corresponds to an antenna port.

In one embodiment, a second spatial Rx parameter group comprises a positive integer number of spatial Rx parameter(s).

In one embodiment, the second spatial Rx parameter group corresponds to a positive integer number of antenna port group(s).

In one embodiment, each spatial Rx parameter in the second spatial Rx parameter group corresponds to an antenna port group.

In one embodiment, the second spatial Rx parameter group corresponds to an antenna port group.

In one embodiment, the second spatial Rx parameter group corresponds to an antenna port.

In one embodiment, the second spatial Rx parameter group comprises spatial Rx parameters comprised in the first spatial Rx parameter group.

Embodiment 12

Figure 12:
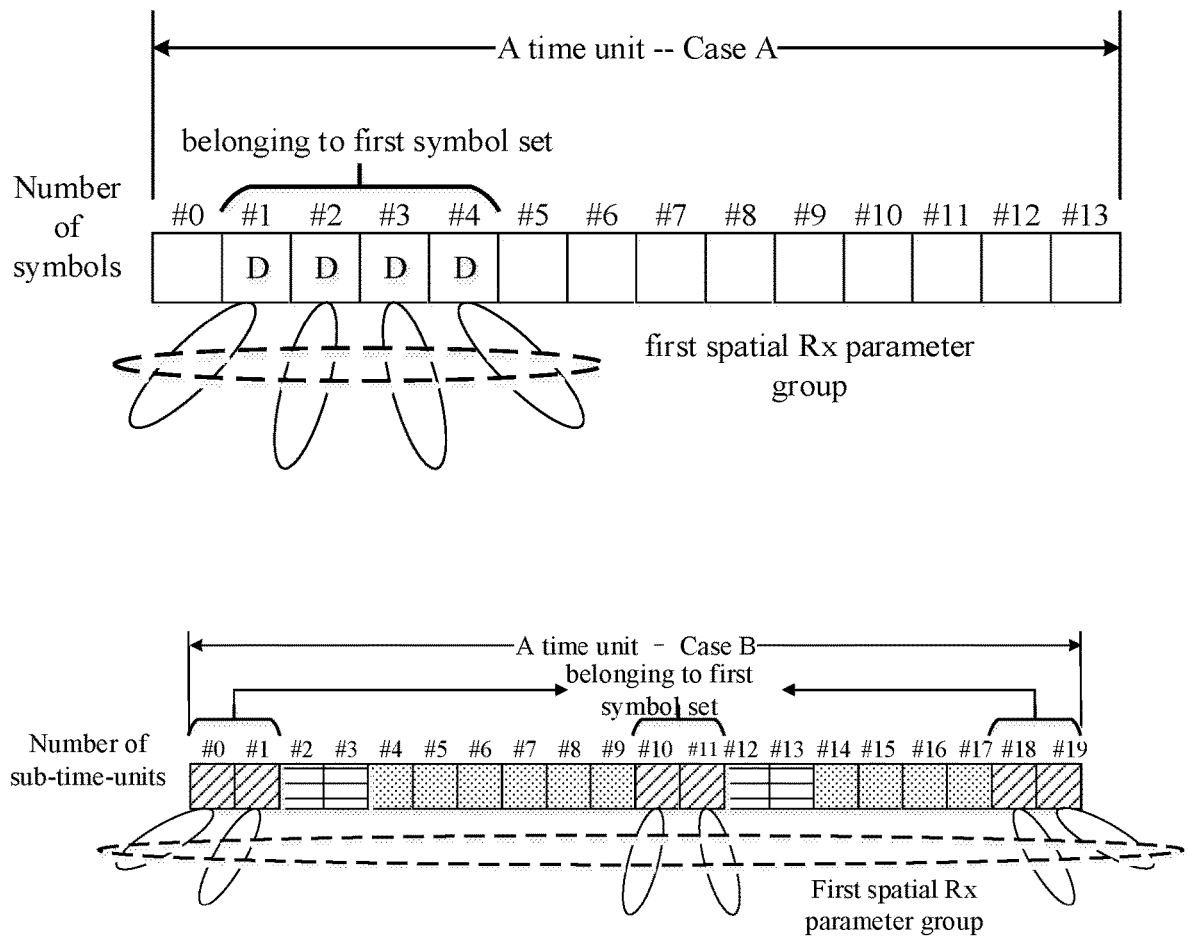
FIG. 12 illustrates a schematic diagram of relationship between a first symbol set and a first spatial Rx parameter group according to one embodiment of the present disclosure.

Embodiment 12 illustrates a schematic diagram of relationship between a first symbol set and a first spatial Rx parameter group according to one embodiment of the present disclosure, as shown in FIG. 12. In FIG. 12, an ellipsis represents a spatial Rx parameter. As illustrated in Case A of FIG. 12, a positive integer number of multicarrier symbol(s) comprised by a time unit corresponding to first-type symbols in a first time unit format belongs(belong) to a first symbol set in the present disclosure; the first symbol set is associated with a first spatial Rx parameter group. As illustrated in Case B of FIG. 12, each multicarrier symbol comprised by a positive integer number of sub-time-unit(s) comprised by a time unit corresponding to a first-type sub-time-unit format of a first time unit format belongs to a first symbol set in the present disclosure.

In Embodiment 12, the first symbol set is associated with a first spatial Rx parameter group, the first spatial Rx parameter group comprising a positive integer number of spatial Rx parameters.

In one embodiment, multicarrier symbol(s) in the first symbol set associated with the first spatial Rx parameter group is(are) used for sidelink communication.

In one embodiment, at least one multicarrier symbol in the first symbol set associated with the first spatial Rx parameter group is used for sidelink communication.

In one embodiment, multicarrier symbol(s) in the first symbol set associated with the first spatial Rx parameter group is(are) used for Sidelink Discovery.

In one embodiment, at least one multicarrier symbol in the first symbol set associated with the first spatial Rx parameter group is used for Sidelink Discovery.

In one embodiment, multicarrier symbol(s) in the first symbol set associated with the first spatial Rx parameter group is(are) used for Sidelink reception.

In one embodiment, at least one multicarrier symbol in the first symbol set associated with the first spatial Rx parameter group is used for Sidelink reception.

In one embodiment, the first node receives on at least one multicarrier symbol in the first symbol set with at least one spatial Rx parameter in the corresponding first spatial Rx parameter group.

In one embodiment, multicarrier symbol(s) comprised in the first symbol set associated with the first spatial Rx parameter group is(are) used by the second node for Sidelink transmission.

In one embodiment, any multicarrier symbol in the first symbol set is associated with at least one spatial Rx parameter in the first spatial Rx parameter group.

In one embodiment, any multicarrier symbol in the first symbol set is associated with each spatial Rx parameter in the first spatial Rx parameter group.

In one embodiment, multicarrier symbol(s) in the first symbol set corresponding to any sub-time-unit is(are) associated with at least one spatial Rx parameter in the first spatial Rx parameter group.

In one embodiment, multicarrier symbol(s) in the first symbol set corresponding to any sub-time-unit is(are) associated with each spatial Rx parameter in the first spatial Rx parameter group.

In one embodiment, sub-time-unit(s) in the first symbol set associated with the first spatial Rx parameter group is(are) used for Sidelink Communication.

In one embodiment, at least one sub-time-unit in the first symbol set associated with the first spatial Rx parameter group is used for Sidelink Communication.

In one embodiment, sub-time-unit(s) in the first symbol set associated with the first spatial Rx parameter group is(are) used for Sidelink Discovery.

In one embodiment, at least one sub-time-unit in the first symbol set associated with the first spatial Rx parameter group is used for Sidelink Discovery.

In one embodiment, the second symbol set is associated with a second spatial Rx parameter group.

In one embodiment, multicarrier symbol(s) in the second symbol set associated with the second spatial Rx parameter group is(are) used for sidelink communication.

In one embodiment, at least one multicarrier symbol in the second symbol set associated with the second spatial Rx parameter group is used for sidelink communication.

In one embodiment, multicarrier symbol(s) in the second symbol set associated with the second spatial Rx parameter group is(are) used for Sidelink reception.

In one embodiment, at least one multicarrier symbol in the second symbol set associated with the second spatial Rx parameter group is used for Sidelink reception.

In one embodiment, the first node receives on at least one multicarrier symbol in the second symbol set with at least one spatial Rx parameter in the corresponding second spatial Rx parameter group.

In one embodiment, multicarrier symbol(s) comprised in the second symbol set associated with the second spatial Rx parameter group is(are) used by the second node for Sidelink transmission.

In one embodiment, any multicarrier symbol in the second symbol set is associated with at least one spatial Rx parameter in the second spatial Rx parameter group.

In one embodiment, any multicarrier symbol in the second symbol set is associated with each spatial Rx parameter in the second spatial Rx parameter group.

Embodiment 13

Figure 13:
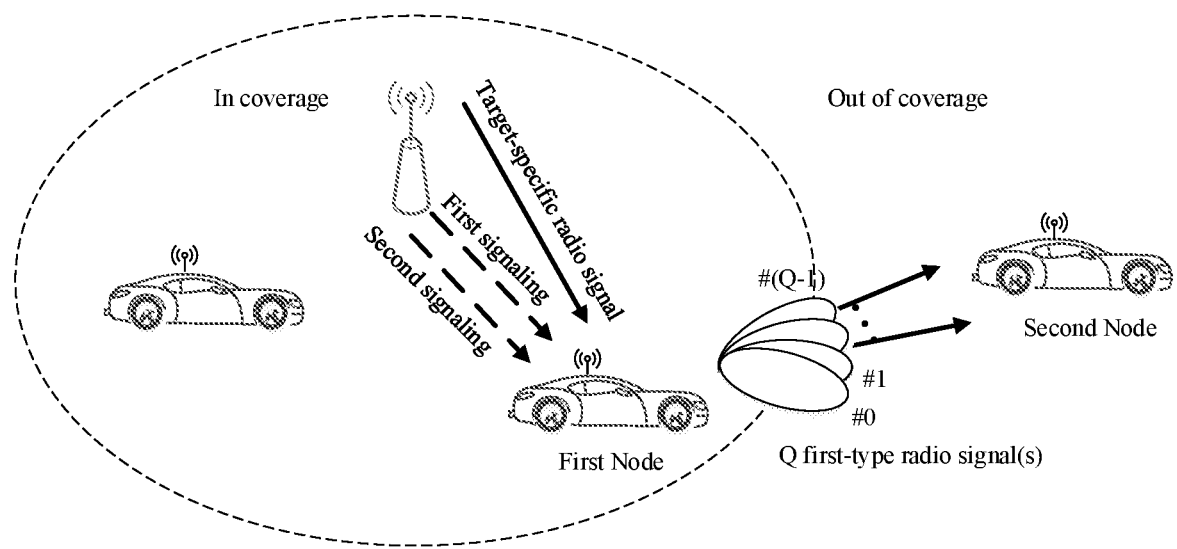
FIG. 13 illustrates a schematic diagram of positional relationship between a first node and a second node according to one embodiment of the present disclosure.

Embodiment 13 illustrates a schematic diagram of positional relationship between a first node and a second node according to one embodiment of the present disclosure, as shown in FIG. 13.

In FIG. 13, the zone inside the ellipsis framed with dotted curves is in coverage, while zones outside the ellipsis are out of coverage.

In Embodiment 13, the first node in the present disclosure receives a target-specific signal and determines whether the first node itself is in coverage according to target received quality of the target-specific signal.

In Embodiment 13, the first node in the present disclosure is in coverage, while the second node in the present disclosure is out of coverage.

In one embodiment, when target received quality of a target-specific signal received by the first node is no smaller than a target threshold, the first node is located in coverage.

In one embodiment, when target received quality of a target-specific signal received by the first node is smaller than a target threshold, the first node is located out of coverage.

In one embodiment, the target-specific signal comprises a Synchronization Signal (SS).

In one embodiment, the target-specific signal comprises a Primary Synchronization Signal (PSS).

In one embodiment, the target-specific signal comprises a Secondary Synchronization Signal (SSS).

In one embodiment, the target-specific signal comprises a Physical Broadcast Signal.

In one embodiment, the target-specific signal comprises a signal transmitted on a Physical Broadcast Channel (PBCH).

In one embodiment, the target-specific signal comprises a PBCH Demodulation Reference Signal (PBCH-DMRS).

In one embodiment, the target-specific signal comprises a SS/PBCH block (SSB).

In one embodiment, the target-specific signal comprises a Reference Signal (RS).

In one embodiment, the target-specific signal comprises a Discovery Reference Signal (DRS).

In one embodiment, the target-specific signal comprises a signal transmitted on a Physical Downlink Control Channel (PDCCH).

In one embodiment, the target-specific signal comprises a Physical Downlink Shared Channel (PDSCH).

In one embodiment, the target received quality comprises Reference Signal Received Power (RSRP).

In one embodiment, the target received quality comprises Sidelink Reference Signal Received Power (S-RSRP).

In one embodiment, the target received quality comprises SCH_RP, that is Received (linear) average power of the resource elements that carry E-UTRA synchronisation signal, measured at the UE antenna connector.

In one embodiment, the target received quality comprises Reference Signal Received Quality (RSRQ).

In one embodiment, the target received quality comprises a Reference Signal Strength Indicator (RSSI).

In one embodiment, the target received quality comprises a Signal to Noise Ratio (SNR).

In one embodiment, the target received quality comprises a Signal to Interference plus Noise Ratio (SINR).

In one embodiment, the target received quality comprises a Block Error Rate (BLER).

In one embodiment, the target received quality comprises a Bit Error Rate (BER).

In one embodiment, the target received quality comprises a Packet Error Rate (PER).

In one embodiment, the target threshold is measured by dB.

In one embodiment, the target threshold is measured by dBm.

In one embodiment, the target threshold is measured by W.

In one embodiment, the target threshold is measured by mW.

In one embodiment, the target threshold is pre-defined, namely, there is no need for signaling configuration.

In one embodiment, the target threshold is configured by a higher-layer signaling.

In one embodiment, the target threshold is configured by system information.

In one embodiment, the target threshold is configured by a SIB.

In one embodiment, the target threshold is configured by an RRC layer signaling.

In one embodiment, the target threshold is configured by a MAC layer signaling.

In one embodiment, the target threshold is configured by a physical layer signaling.

In one embodiment, each second-type radio signal of the Q second-type radio signal(s) comprises second information, the second information being used for indicating whether the first node is within the coverage of a cell.

In one embodiment, when a first received quality of a first specific signal of at least one serving cell received by the first node is greater than a first threshold, the first node is within the coverage of a cell.

In one embodiment, the first specific signal comprises a Synchronization Signal (SS).

In one embodiment, the first specific signal comprises a Primary Synchronization Signal (PSS).

In one embodiment, the first specific signal comprises a Secondary Synchronization Signal (SSS).

In one embodiment, the first specific signal comprises a Physical Broadcast Signal.

In one embodiment, the first specific signal comprises a signal transmitted on a PBCH.

In one embodiment, the first specific signal comprises a PBCH-DMRS.

In one embodiment, the first specific signal comprises an SSB.

In one embodiment, the first specific signal comprises a RS.

In one embodiment, the first specific signal comprises a DRS.

In one embodiment, the first specific signal comprises a signal transmitted on a PDCCH.

In one embodiment, the first specific signal comprises a signal transmitted on a PDSCH.

In one embodiment, the first received quality comprises RSRP.

In one embodiment, the first received quality comprises SCH_RP.

In one embodiment, the first received quality comprises RSRQ.

In one embodiment, the first received quality comprises an RSSI.

In one embodiment, the first received quality comprises an SNR.

In one embodiment, the first received quality comprises a SINR.

In one embodiment, the first received quality comprises a BLER.

In one embodiment, the first received quality comprises a BER.

In one embodiment, the first received quality comprises a PER.

In one embodiment, the first threshold is measured by dBm.

In one embodiment, the first threshold is measured by mW.

In one embodiment, the first threshold is pre-defined, namely, there is no need for signaling configuration.

In one embodiment, the first threshold is configured by a higher-layer signaling.

In one embodiment, the first threshold is configured by system information.

In one embodiment, the first threshold is configured by a SIB.

In one embodiment, the first threshold is configured by an RRC layer signaling.

In one embodiment, the first threshold is configured by a MAC layer signaling.

In one embodiment, the first threshold is configured by a physical layer signaling.

In one embodiment, each second-type radio signal of the Q second-type radio signal(s) comprises second information, the second information being used for indicating whether the first node is within the coverage of the GNSS.

In one embodiment, the GNSS includes one or more of the Global Positioning System (GPS), Galileo, Compass, GLONASS, Indian Regional Navigation Satellite System (IRNSS) or Quasi-Zenith Satellite System (QZSS).

In one embodiment, when a second received quality of a second specific signal of the GNSS received by the first node is larger than a second threshold, the first node is within the coverage of the GNSS.

In one embodiment, the second specific signal comprises a Synchronization Signal (SS).

In one embodiment, the second specific signal comprises a Primary Synchronization Signal (PSS).

In one embodiment, the second specific signal comprises a Secondary Synchronization Signal (SSS).

In one embodiment, the second specific signal comprises a Physical Broadcast Signal.

In one embodiment, the second specific signal comprises a signal transmitted on a PBCH.

In one embodiment, the second specific signal comprises a PBCH-DMRS.

In one embodiment, the second specific signal comprises an SSB.

In one embodiment, the second specific signal comprises a RS.

In one embodiment, the second specific signal comprises a DRS.

In one embodiment, the second specific signal comprises a signal transmitted on a PDCCH.

In one embodiment, the second specific signal comprises a signal transmitted on a PDSCH.

In one embodiment, the second received quality comprises RSRP.

In one embodiment, the second received quality comprises SCH_RP.

In one embodiment, the second received quality comprises RSRQ.

In one embodiment, the second received quality comprises an RSSI.

In one embodiment, the second received quality comprises an SNR.

In one embodiment, the second received quality comprises a SINR.

In one embodiment, the second received quality comprises a BLER.

In one embodiment, the second received quality comprises a BER.

In one embodiment, the second received quality comprises a PER.

In one embodiment, the second threshold is measured by dBm.

In one embodiment, the second threshold is measured by mW.

In one embodiment, the second threshold is pre-defined, namely, there is no need for signaling configuration.

In one embodiment, the second threshold is configured by a higher-layer signaling.

In one embodiment, the second threshold is configured by system information.

In one embodiment, the second threshold is configured by a SIB.

In one embodiment, the second threshold is configured by an RRC layer signaling.

In one embodiment, the second threshold is configured by a MAC layer signaling.

In one embodiment, the second threshold is configured by a physical layer signaling.

In one embodiment, when a first received quality of a first specific signal of a serving cell that the first node fails to detect is greater than a first threshold, the first node is located out of the coverage of the cell.

In one embodiment, when a second received quality of a second specific signal of the GNSS that the first node fails to detect is greater than a second threshold, the first node is located out of the coverage of the GNSS.

In one embodiment, when the first node fails to detect a first received quality of a first specific signal of a serving cell that is greater than a first threshold, or, when the first node fails to detect a second received quality of a second specific signal of the GNSS that is greater than a second threshold, the first node is out of coverage.

In one embodiment, when the first node fails to detect a first received quality of a first specific signal of a serving cell that is greater than a first threshold, and when the first node fails to detect a second received quality of a second specific signal of the GNSS that is greater than a second threshold, the first node is out of coverage.

Embodiment 14

Figure 14:
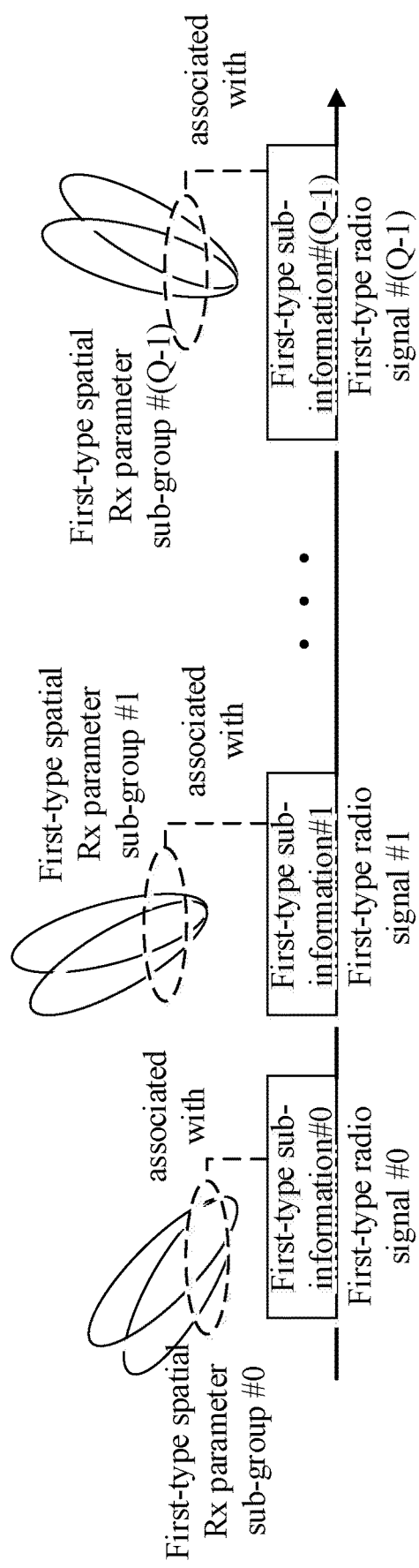
FIG. 14 illustrates a schematic diagram of relationship between first-type sub-information and a first-type spatial Rx parameter group according to one embodiment of the present disclosure.

Embodiment 14 illustrates a schematic diagram of relationship between first-type sub-information and a first-type spatial Rx parameter group according to one embodiment of the present disclosure, as shown in FIG. 14. In FIG. 14, the Q first-type radio signal(s) respectively comprises(comprise) Q piece(s) of first-type sub-information, and the Q first-type radio signal(s) is(are) marked with respective sequence number(s) from first-type radio signal #0, first-type radio signal #1 . . . and first-type radio signal #(Q−1). In FIG. 14, the Q first-type radio signal(s) is(are) respectively associated with Q first-type spatial Rx parameter sub-group(s), which is(are) marked with respective sequence number(s) from first-type spatial Rx parameter sub-group #0, first-type spatial Rx parameter sub-group #1 . . . , and first-type spatial Rx parameter sub-group #(Q−1); the Q piece(s) of first-type sub-information is(are) respectively used for indicating the Q first-type spatial Rx parameter sub-group(s) associated with the Q first-type radio signal(s).

In one embodiment, the Q first-type radio signal(s) is(are) respectively associated with Q first-type spatial Rx parameter sub-group(s), of which any first-type spatial Rx parameter sub-group comprises a non-negative integer number of spatial Rx parameter(s).

In one embodiment, a first spatial Rx parameter group comprises at least one first-type spatial Rx parameter sub-group of the Q first-type spatial Rx parameter sub-group(s).

In one embodiment, a second spatial Rx parameter group comprises at least one first-type spatial Rx parameter sub-group of the Q first-type spatial Rx parameter sub-group(s).

In one embodiment, a second spatial Rx parameter group comprises the Q first-type spatial Rx parameter sub-group(s).

In one embodiment, each first-type symbol group of Q first-type symbol group(s) comprises a non-negative integer number of multicarrier symbol(s) corresponding to first-type symbols.

In one embodiment, multicarrier symbol(s) comprised by each of the Q first-type symbol group(s) belongs(belong) to the first symbol set.

In one embodiment, first target sub-information is one of Q piece(s) of first-type sub-information, and a first target radio signal is one of Q first-type radio signal(s) that comprises the first target sub-information.

In one embodiment, a first target spatial Rx parameter sub-group is one of the Q first-type spatial Rx parameter sub-group(s) that is associated with the first target radio signal.

In one embodiment, the first target sub-information is used for indicating one of Q first-type symbol group that is associated with the first target spatial Rx parameter subgroup.

In one embodiment, the first data bit block comprises the first target sub-information.

In one embodiment, the first information comprises the first target sub-information.

In one embodiment, the first information is composed of the Q piece(s) of first-type sub-information.

Embodiment 15

Figure 15:
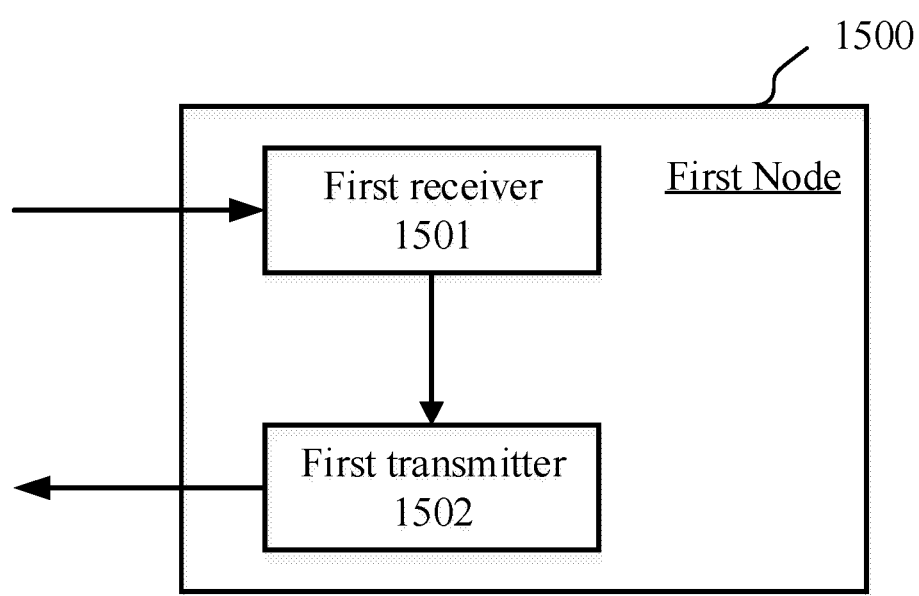
FIG. 15 illustrates a structure block diagram of a processing device in a first node according to one embodiment of the present disclosure.

Embodiment 15 illustrates a structure block diagram of a processing device in a first node, as shown in FIG. 15. In Embodiment 15, a first node's processing device 1500 is composed by a first receiver 1501 and a first transmitter 1502.

In one embodiment, the first receiver 1501 comprises at least one of the antenna 452, the transmitter/receiver 454, the multi-antenna receiving processor 458, the receiving processor 456, the controller/processor 459, the memory 460 or the data source 467 in FIG. 4 of the present disclosure.

In one embodiment, the first transmitter 1502 comprises at least one of the antenna 452, the transmitter/receiver 454, the multi-antenna transmitting processor 457, the transmitting processor 468, the controller/processor 459, the memory 460 or the data source 467 in FIG. 4 of the present disclosure.

In Embodiment 15, the first receiver 1501 receives a first signaling, the first signaling being used for indicating a first time unit format in the present disclosure; the first transmitter 1502 transmits first information and second information; herein, the first information is used for indicating a first symbol set and a second symbol set; the first symbol set and the second symbol set respectively comprise a positive integer number of multicarrier symbol(s); each multicarrier symbol in the first symbol set corresponds to first-type symbols in the first time unit format, while each multicarrier symbol in the second symbol set corresponds to second-type symbols in the first time unit format; each of the first-type symbols comprises (a) downlink symbol(s), while each of the second-type symbols comprises (an) uplink symbol(s); the second information is used for indicating a first spatial Rx parameter group associated with the first symbol set.

In Embodiment 15, the first receiver 1501 autonomously determines a first time unit format; the first transmitter 1502 transmits first information and second information; herein, the first information is used for indicating a first symbol set and a second symbol set; the first symbol set and the second symbol set respectively comprise a positive integer number of multicarrier symbol(s); each multicarrier symbol in the first symbol set corresponds to first-type symbols in the first time unit format, while each multicarrier symbol in the second symbol set corresponds to second-type symbols in the first time unit format; each of the first-type symbols comprises (a) downlink symbol(s), while each of the second-type symbols comprises (an) uplink symbol(s); the second information is used for indicating a first spatial Rx parameter group associated with the first symbol set.

In Embodiment 15, the first receiver 1501 receives a second signaling, the second signaling being used for indicating a first time unit set; herein, the first time unit set comprises a positive integer number of time unit(s); each time unit of the positive integer number of time unit(s) comprises a positive integer number of multicarrier symbol(s); the first symbol set is composed of multicarrier symbol(s) in the first time unit set corresponding to the first-type symbols in the first time unit format, while the second symbol set is composed of multicarrier symbol(s) in the first time unit set corresponding to the second-type symbols in the first time unit format.

In Embodiment 15, the first receiver 1501 autonomously determines a first time unit set; herein, the first time unit set comprises a positive integer number of time unit(s); each time unit of the positive integer number of time unit(s) comprises a positive integer number of multicarrier symbol(s); the first symbol set is composed of multicarrier symbol(s) in the first time unit set corresponding to the first-type symbols in the first time unit format, while the second symbol set is composed of multicarrier symbol(s) in the first time unit set corresponding to the second-type symbols in the first time unit format.

In one embodiment, the first receiver 1501 determines whether the first node is in coverage.

In one embodiment, the first transmitter 1502 transmits Q first-type radio signal(s), Q being a positive integer; herein, each of the Q first-type radio signal(s) comprises the first information and the second information.

In one embodiment, the first transmitter 1502 transmits Q first-type radio signal(s), Q being a positive integer; herein, the first information is composed of Q piece(s) of first-type sub-information, and the Q first-type radio signal(s) comprises(comprise) the Q piece(s) of first-type sub-information respectively, while the second information is determined jointly by the Q first-type radio signal(s) and the Q piece(s) of first-type sub-information.

In one embodiment, the first receiver 1501 receives a target-specific signal, and determines whether the first node is in coverage according to the target received quality of the target-specific signal.

In one embodiment, the first receiver 1501 receives a second radio signal; herein, the first information and the second information are used for determining at least one of a time-domain resource or a spatial-domain resource occupied by the second radio signal.

In one embodiment, the first node is a UE.

In one embodiment, the first node is a relay node.

Embodiment 16

Figure 16:
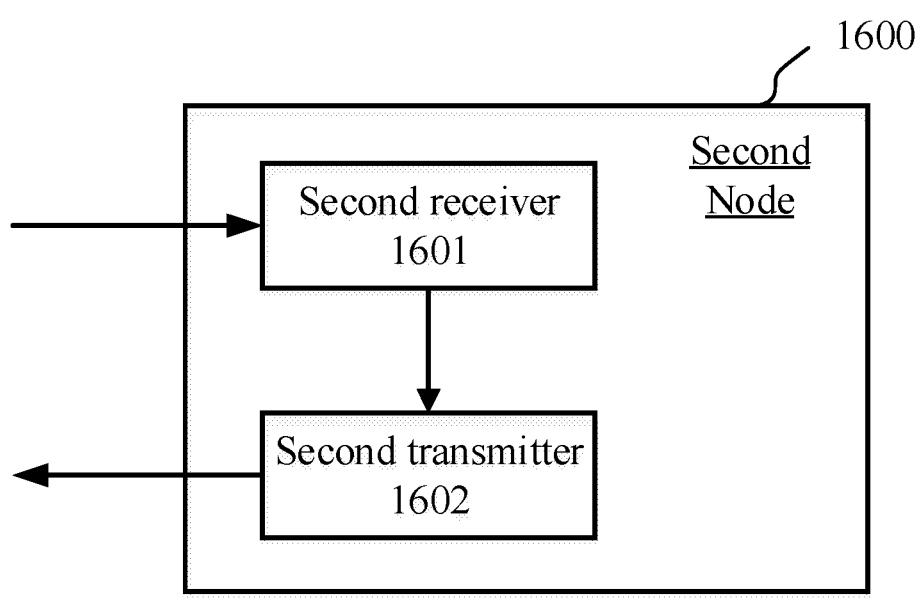
FIG. 16 illustrates a structure block diagram of a processing device in a second node according to one embodiment of the present disclosure.

Embodiment 16 illustrates a structure block diagram of a processing device in a second node, as shown in FIG. 16. In FIG. 16, a second node's processing device 1600 is composed of a second receiver 1601 and a second transmitter 1602.

In one embodiment, the second receiver 1601 comprises at least one of the antenna 420, the transmitter/receiver 418, the multi-antenna receiving processor 472, the receiving processor 470, the controller/processor 475 or the memory 476 in FIG. 4 of the present disclosure.

In one embodiment, the second transmitter 1602 comprises at least one of the antenna 420, the transmitter/receiver 418, the multi-antenna transmitting processor 471, the transmitting processor 416, the controller/processor 475 or the memory 476 in FIG. 4 of the present disclosure.

In Embodiment 16, the second receiver 1601 receives first information and second information; herein, the first information is used for indicating a first symbol set and a second symbol set; the first symbol set and the second symbol set respectively comprise a positive integer number of multicarrier symbol(s); each multicarrier symbol in the first symbol set corresponds to first-type symbols in a first time unit format, while each multicarrier symbol in the second symbol set corresponds to second-type symbols in a first time unit format; each of the first-type symbols comprises (a) downlink symbol(s), while each of the second-type symbols comprises (an) uplink symbol(s); the second information is used for indicating a first spatial Rx parameter group associated with the first symbol set; the first time unit format is indicated by a first signaling.

In Embodiment 16, the second receiver 1601 receives first information and second information; herein, the first information is used for indicating a first symbol set and a second symbol set; the first symbol set and the second symbol set respectively comprise a positive integer number of multicarrier symbol(s); each multicarrier symbol in the first symbol set corresponds to first-type symbols in a first time unit format, while each multicarrier symbol in the second symbol set corresponds to second-type symbols in a first time unit format; each of the first-type symbols comprises (a) downlink symbol(s), while each of the second-type symbols comprises (an) uplink symbol(s); the second information is used for indicating a first spatial Rx parameter group associated with the first symbol set; the first time unit format is autonomously determined by a transmitter of the first information and the second information.

In one embodiment, a first time unit set is indicated by a second signaling; the first time unit set comprises a positive integer number of time unit(s); each time unit of the positive integer number of time unit(s) comprises a positive integer number of multicarrier symbol(s); the first symbol set is composed of multicarrier symbol(s) in the first time unit set corresponding to the first-type symbols in the first time unit format, while the second symbol set is composed of multicarrier symbol(s) in the first time unit set corresponding to the second-type symbols in the first time unit format.

In one embodiment, a first time unit set is determined by a transmitter of the first information and the second information autonomously; the first time unit set comprises a positive integer number of time unit(s); each time unit of the positive integer number of time unit(s) comprises a positive integer number of multicarrier symbol(s); the first symbol set is composed of multicarrier symbol(s) in the first time unit set corresponding to the first-type symbols in the first time unit format, while the second symbol set is composed of multicarrier symbol(s) in the first time unit set corresponding to the second-type symbols in the first time unit format.

In one embodiment, when the transmitter of the first information and the second information is in coverage, the first time unit format is indicated by the first signaling; when the transmitter of the first information and the second information is out of coverage, the first time unit format is determined autonomously.

In one embodiment, the second receiver 1601 receives Q0 first-type radio signal(s) of Q first-type radio signal(s), both Q and Q0 being positive integers; herein, each first-type radio signal of the Q first-type radio signal(s) comprises the first information and the second information.

In one embodiment, the second receiver 1601 receives Q0 first-type radio signal(s) of Q first-type radio signal(s), both Q and Q0 being positive integers; herein, the first information is composed of Q piece(s) of first-type sub-information, and the Q first-type radio signal(s) comprises(comprise) the Q piece(s) of first-type sub-information respectively, while the second information is determined jointly by the Q first-type radio signal(s) and the Q piece(s) of first-type sub-information.

In one embodiment, received quality of the received target-specific signal is used by the transmitter of the first information and the second information for determining whether the transmitter is in coverage.

In one embodiment, the second transmitter 1602 transmits a second radio signal; herein, the first information and the second information are used for determining at least one of a time-domain resource or a spatial-domain resource occupied by the second radio signal.

In one embodiment, the second node is a UE.

In one embodiment, the second node is a relay node.

Embodiment 17

Figure 17:
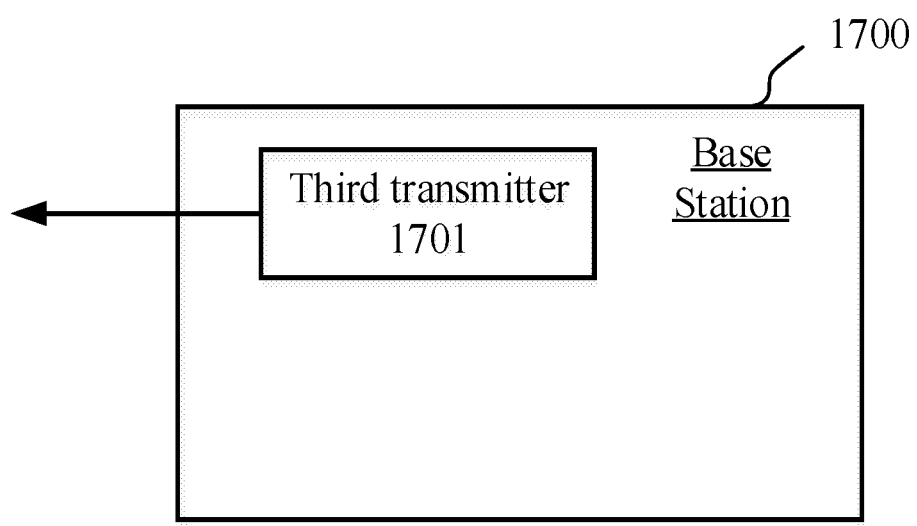
FIG. 17 illustrates a structure block diagram of a processing device in a base station according to one embodiment of the present disclosure.

Embodiment 17 illustrates a structure block diagram of a processing device in a base station, as shown in FIG. 17. In FIG. 17, a base station's processing device 1700 is composed of a third transmitter 1701.

In one embodiment, the third transmitter 1701 comprises at least one of the antenna 420, the transmitter/receiver 418, the multi-antenna transmitting processor 471, the transmitting processor 416, the controller/processor 475 or the memory 476 in FIG. 4 of the present disclosure.

In Embodiment 17, the third transmitter 1701 transmits a first signaling, the first signaling being used for indicating a first time unit format; herein, the first information is used for indicating a first symbol set and a second symbol set; the first symbol set and the second symbol set respectively comprise a positive integer number of multicarrier symbol(s); each multicarrier symbol in the first symbol set corresponds to first-type symbols in the first time unit format, while each multicarrier symbol in the second symbol set corresponds to second-type symbols in the first time unit format; each of the first-type symbols comprises (a) downlink symbol(s), while each of the second-type symbols comprises (an) uplink symbol(s); the second information is used for indicating a first spatial Rx parameter group associated with the first symbol set; the first information and the second information are transmitted by a receiver of the first signaling.

In one embodiment, the third transmitter 1701 transmits a second signaling, the second signaling being used for indicating a first time unit set; herein, the first time unit set comprises a positive integer number of time unit(s); each time unit of the positive integer number of time unit(s) comprises a positive integer number of multicarrier symbol(s); the first symbol set is composed of multicarrier symbol(s) in the first time unit set corresponding to the first-type symbols in the first time unit format, while the second symbol set is composed of multicarrier symbol(s) in the first time unit set corresponding to the second-type symbols in the first time unit format.

In one embodiment, when the receiver of the first signaling is in coverage, the first time unit format is indicated by the first signaling; when the receiver of the first signaling is out of coverage, the first time unit format is determined autonomously.

In one embodiment, each first-type radio signal of the Q first-type radio signal(s) comprises the first information and the second information; the Q is a positive integer.

In one embodiment, the first information is composed of Q piece(s) of first-type sub-information; and the Q first-type radio signal(s) comprises(comprise) the Q piece(s) of first-type sub-information respectively; the second information is determined jointly by the Q first-type radio signal(s) and the Q piece(s) of first-type sub-information; the Q is a positive integer.

In one embodiment, the third transmitter 1701 transmits a target-specific signal, and determines whether the receiver of the first signaling is in coverage according to target received quality of the target-specific signal.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first node includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The second node in the present disclosure includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The base station or network-side equipment includes but is not limited to macro-cellular base stations, micro-cellular base stations, home base stations, relay base station, eNB, gNB, Transmitter Receiver Point (TRP), relay satellite, satellite base station, airborne base station and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a first node for wireless communications, comprising:
    receiving a second signaling, the second signaling being used for indicating a first time unit set or, autonomously determining a first time unit set;
    receiving a first signaling, the first signaling being used for indicating a first time unit format; or, autonomously determining a first time unit format;
    transmitting first information and second information;
    wherein the first information is used for indicating a first symbol set and a second symbol set; the first symbol set and the second symbol set respectively comprise a positive integer number of multicarrier symbol(s); each multicarrier symbol in the first symbol set corresponds to first-type symbols in the first time unit format, while each multicarrier symbol in the second symbol set corresponds to second-type symbols in the first time unit format; each of the first-type symbols comprises (a) downlink symbol(s), while each of the second-type symbols comprises (an) uplink symbol(s); the second information is used for indicating a first spatial Rx parameter group associated with the first symbol set, the first node receiving on at least one multicarrier symbol in the first symbol set with at least one spatial Rx parameter in the corresponding first spatial Rx parameter group; the first time unit set comprises a positive integer number of time unit(s); each time unit of the positive integer number of time unit(s) comprises a positive integer number of multicarrier symbol(s); the first symbol set is composed of multicarrier symbol(s) in the first time unit set corresponding to the first-type symbols in the first time unit format, while the second symbol set is composed of multicarrier symbol(s) in the first time unit set corresponding to the second-type symbols in the first time unit format.

2. The method according to claim 1 comprising:
    receiving a target-specific signal to determine whether the first node is in coverage;
    wherein whether the first node is in coverage is determined according to target received quality of the target-specific signal; when the first node is in coverage, the first time unit format is indicated by the first signaling; when the first node is out of coverage, the first time unit format is determined autonomously.

3. The method according to claim 1, comprising:
    transmitting Q first-type radio signal(s), Q being a positive integer;
    wherein each of the Q first-type radio signal(s) comprises the first information and the second information.

4. The method according to claim 1, comprising:
    transmitting Q first-type radio signal(s), Q being a positive integer;
    wherein the first information is composed of Q piece(s) of first-type sub-information, and the Q first-type radio signal(s) comprises(comprise) the Q piece(s) of first-type sub-information respectively, while the second information is determined jointly by the Q first-type radio signal(s) and the Q piece(s) of first-type sub-information.

5. The method according to claim 4, comprising:
    receiving a second radio signal;
    wherein the first information and the second information are used for determining at least one of a time-domain resource or a spatial-domain resource occupied by the second radio signal.

6. A method in a second node for wireless communications, comprising:
    receiving first information and second information;
    wherein the first information is used for indicating a first symbol set and a second symbol set; the first symbol set and the second symbol set respectively comprise a positive integer number of multicarrier symbol(s); each multicarrier symbol in the first symbol set corresponds to first-type symbols in a first time unit format, while each multicarrier symbol in the second symbol set corresponds to second-type symbols in a first time unit format; each of the first-type symbols comprises (a) downlink symbol(s), while each of the second-type symbols comprises (an) uplink symbol(s); the second information is used for indicating a first spatial Rx parameter group associated with the first symbol set, the transmitter of the second information receiving on at least one multicarrier symbol in the first symbol set with at least one spatial Rx parameter in the corresponding first spatial Rx parameter group; the first time unit format is indicated by a first signaling, or, the first time unit format is autonomously determined by a transmitter of the first information and the second information; a first time unit set is indicated by a second signaling, or a first time unit set is determined by a transmitter of the first information and the second information autonomously; the first time unit set comprises a positive integer number of time unit(s); each time unit of the positive integer number of time unit(s) comprises a positive integer number of multicarrier symbol(s); the first symbol set is composed of multicarrier symbol(s) in the first time unit set corresponding to the first-type symbols in the first time unit format, while the second symbol set is composed of multicarrier symbol(s) in the first time unit set corresponding to the second-type symbols in the first time unit format.

7. The method according to claim 6, comprising:
receiving Q0 first-type radio signal(s) of Q first-type radio signal(s), both Q and Q0 being positive integers;
wherein each first-type radio signal of the Q first-type radio signal(s) comprises the first information and the second information;
or, the first information is composed of Q piece(s) of first-type sub-information, and the Q first-type radio signal(s) comprises(comprise) the Q piece(s) of first-type sub-information respectively, while the second information is determined jointly by the Q first-type radio signal(s) and the Q piece(s) of first-type sub-information.

8. The method according to claim 7, comprising:
transmitting a second radio signal;
wherein the first information and the second information are used for determining at least one of a time-domain resource or a spatial-domain resource occupied by the second radio signal.

9. A first node for wireless communications, comprising:
a first receiver: receiving a first signaling and a second signaling; the first signaling being used for indicating a first time unit format; or, autonomously determining a first time unit format; the second signaling being used for indicating a first time unit set or, autonomously determining a first time unit set;
a first transmitter: transmitting first information and second information;
wherein the first information is used for indicating a first symbol set and a second symbol set; the first symbol set and the second symbol set respectively comprise a positive integer number of multicarrier symbol(s); each multicarrier symbol in the first symbol set corresponds to first-type symbols in the first time unit format, while each multicarrier symbol in the second symbol set corresponds to second-type symbols in the first time unit format; each of the first-type symbols comprises (a) downlink symbol(s), while each of the second-type symbols comprises (an) uplink symbol(s); the second information is used for indicating a first spatial Rx parameter group associated with the first symbol set, the first node receiving on at least one multicarrier symbol in the first symbol set with at least one spatial Rx parameter in the corresponding first spatial Rx parameter group; the first time unit set comprises a positive integer number of time unit(s); each time unit of the positive integer number of time unit(s) comprises a positive integer number of multicarrier symbol(s); the first symbol set is composed of multicarrier symbol(s) in the first time unit set corresponding to the first-type symbols in the first time unit format, while the second symbol set is composed of multicarrier symbol(s) in the first time unit set corresponding to the second-type symbols in the first time unit format.

10. The first node according to claim 9, comprising:
the first receiver, receiving a target-specific signal to determine whether the first node is in coverage;
wherein whether the first node is in coverage is determined according to target received quality of the target-specific signal; when the first node is in coverage, the first time unit format is indicated by the first signaling; when the first node is out of coverage, the first time unit format is determined autonomously.

11. The first node according to claim 9, comprising:
the first transmitter, transmitting Q first-type radio signal(s), Q being a positive integer;
wherein each of the Q first-type radio signal(s) comprises the first information and the second information.

12. The first node according to claim 9, comprising:
the first transmitter, transmitting Q first-type radio signal(s), Q being a positive integer;
wherein the first information is composed of Q piece(s) of first-type sub-information, and the Q first-type radio signal(s) comprises(comprise) the Q piece(s) of first-type sub-information respectively, while the second information is determined jointly by the Q first-type radio signal(s) and the Q piece(s) of first-type sub-information.

13. The first node according to claim 12, comprising:
the first receiver, receiving a second radio signal;
wherein the first information and the second information are used for determining at least one of a time-domain resource or a spatial-domain resource occupied by the second radio signal.

14. A second node for wireless communications, comprising:
a second receiver, receiving Q0 first-type radio signal(s) of Q first-type radio signal(s), both Q and Q0 being positive integers; wherein each first-type radio signal of the Q first-type radio signal(s) comprises a first information and a second information; or a first information is composed of Q piece(s) of first-type sub-information, and the Q first-type radio signal(s) comprises(comprise) the Q piece(s) of first-type sub-information respectively, while a second information is determined jointly by the Q first-type radio signal(s) and the Q piece(s) of first-type sub-information, both Q and Q0 being positive integers;
wherein the first information is used for indicating a first symbol set and a second symbol set; the first symbol set and the second symbol set respectively comprise a positive integer number of multicarrier symbol(s); each multicarrier symbol in the first symbol set corresponds to first-type symbols in a first time unit format, while each multicarrier symbol in the second symbol set corresponds to second-type symbols in a first time unit format; each of the first-type symbols comprises (a) downlink symbol(s), while each of the second-type symbols comprises (an) uplink symbol(s); the second information is used for indicating a first spatial Rx parameter group associated with the first symbol set, the transmitter of the second information receiving on at least one multicarrier symbol in the first symbol set with at least one spatial Rx parameter in the corresponding first spatial Rx parameter group; the first time unit format is indicated by a first signaling, or, the first time unit format is autonomously determined by a transmitter of the first information and the second information; a first time unit set is indicated by a second signaling, or a first time unit set is determined by a transmitter of the first information and the second information autonomously; a first time unit set is indicated by a second signaling, or a first time unit set is determined by a transmitter of the first information and the second information autonomously; the first time unit set comprises a positive integer number of time unit(s); each time unit of the positive integer number of time unit(s) comprises a positive integer number of multicarrier symbol(s); the first symbol set is composed of multicarrier symbol(s) in the first time unit set corresponding to the first-type symbols in the first time unit format, while the second symbol set is composed of multicarrier symbol(s) in the first time unit set corresponding to the second-type symbols in the first time unit format.

15. The second node according to claim 14, comprising:

a second transmitter, transmitting a second radio signal;

wherein the first information and the second information are used for determining at least one of a time-domain resource or a spatial-domain resource occupied by the second radio signal.

\* \* \* \* \*